（12）United States Patent
Long et al.

(10) Patent No.: US 11,761,515 B2
(45) Date of Patent: Sep. 19, 2023

(54) WORK VEHICLE MULTI-SPEED DRIVE ASSEMBLY WITH GUIDED DOG CLUTCH

(71) Applicant: Deere & Company, Moline, IL (US)

(72) Inventors: Randall L. Long, Coffeyville, KS (US); Lisa R. Lloyd, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 17/325,437

(22) Filed: May 20, 2021

(65) Prior Publication Data

US 2022/0372730 A1 Nov. 24, 2022

(51) Int. Cl.
| | |
|---|---|
| *F16D 25/04* | (2006.01) |
| *F16D 23/02* | (2006.01) |
| *F16H 3/46* | (2006.01) |
| *F16H 57/02* | (2012.01) |

(52) U.S. Cl.
CPC ............ *F16H 3/46* (2013.01); *F16D 25/044* (2013.01); *F16H 2057/02034* (2013.01); *F16H 2057/02052* (2013.01); *F16H 2057/02056* (2013.01); *F16H 2200/0034* (2013.01);
(Continued)

(58) Field of Classification Search
CPC ......... F16D 11/00–14; F16D 23/02–10; B60K 7/00–2007/0092
See application file for complete search history.

(56) References Cited

U.S. PATENT DOCUMENTS

| | | | |
|---|---|---|---|
| 1,625,564 | A | 4/1927 | Pollard |
| 2,685,948 | A | 8/1954 | Freeman et al. |
| 3,062,073 | A | 11/1962 | Brass |

(Continued)

FOREIGN PATENT DOCUMENTS

| | | |
|---|---|---|
| CN | 106763565 A | 5/2017 |
| DE | 2619011 A1 | 12/1981 |

(Continued)

OTHER PUBLICATIONS

German Search Report issued in German Application No. 102021113924.4 dated Sep. 30, 2021. (7 pages).

(Continued)

*Primary Examiner* — David R Morris
*Assistant Examiner* — Lillian T Nguyen
(74) *Attorney, Agent, or Firm* — KLINTWORTH & ROZENBLAT IP LLP

(57) ABSTRACT

A drive assembly for a work vehicle includes a drive housing, a drive shaft rotatable about a drive axis, an inner hub rotationally fixed to the drive shaft, and a planetary gear set coupled to the drive shaft and configured to selectively rotate an output element. The drive assembly also includes a clutch arrangement having a clutch ring configured to selectively engage the planetary gear set. The clutch arrangement further includes a guide assembly mounted on the clutch ring and configured to selectively interact with the planetary gear set to effect disengagement of the clutch ring from the planetary gear set. A clutch actuation assembly is configured to effect movement of the clutch arrangement along the drive axis to engage the planetary gear set, and a guide actuation assembly is configured to operate the guide assembly to interact with the planetary gear set.

18 Claims, 23 Drawing Sheets

(52) U.S. Cl.
CPC ............... *F16H 2200/0086* (2013.01); *F16H 2200/2005* (2013.01); *F16H 2200/2035* (2013.01)

(56) References Cited

U.S. PATENT DOCUMENTS

| | | | |
|---|---|---|---|
| 3,081,759 A | 3/1963 | Mauck et al. | |
| 3,150,544 A | 9/1964 | Brass | |
| 3,640,152 A | 2/1972 | Shirai et al. | |
| 3,675,511 A | 7/1972 | Wakamatsu et al. | |
| 3,942,024 A | 3/1976 | Ingham | |
| 4,122,354 A | 10/1978 | Howland | |
| 4,213,299 A | 7/1980 | Sharar | |
| 4,473,752 A | 9/1984 | Cronin | |
| 4,484,495 A | 11/1984 | Mason | |
| 4,569,252 A | 2/1986 | Harper | |
| 4,631,455 A | 12/1986 | Taishoff | |
| 4,708,030 A | 11/1987 | Cordner | |
| 4,750,384 A | 6/1988 | Belliveau | |
| 4,862,009 A | 8/1989 | King | |
| 4,916,980 A | 4/1990 | Asada et al. | |
| 4,926,713 A | 5/1990 | Madill | |
| 5,033,994 A | 7/1991 | Wu | |
| 5,177,968 A | 1/1993 | Fellows | |
| 5,418,400 A | 5/1995 | Stockton | |
| 5,558,173 A | 9/1996 | Sherman | |
| 5,856,709 A | 1/1999 | Ibaraki et al. | |
| 5,993,354 A | 11/1999 | Winks | |
| 6,015,363 A | 1/2000 | Mathis | |
| 6,371,877 B1 | 4/2002 | Schroeder et al. | |
| 6,378,479 B1 | 4/2002 | Nishidate et al. | |
| RE37,743 E | 6/2002 | Yang | |
| 6,409,622 B1 | 6/2002 | Bolz et al. | |
| 6,484,596 B2 | 11/2002 | Puchas | |
| 6,527,658 B2 | 3/2003 | Holmes et al. | |
| 6,569,054 B2 | 5/2003 | Kato | |
| 6,582,333 B2 | 6/2003 | Man | |
| 6,661,109 B2 | 12/2003 | Fukasaku et al. | |
| 6,746,354 B1 | 6/2004 | Ziemer | |
| 6,770,005 B2 | 8/2004 | Aikawa et al. | |
| 6,811,010 B1 | 11/2004 | Armstrong | |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 | 11/2005 | Fukasaku et al. | |
| 7,028,794 B2 | 4/2006 | Odahara et al. | |
| 7,044,255 B2 | 5/2006 | Maeda et al. | |
| 7,086,978 B2 | 8/2006 | Aikawa et al. | |
| 7,117,965 B2 | 10/2006 | Yatabe et al. | |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Kozarekar et al. | |
| 7,582,033 B2 | 9/2009 | Kefti-Cherif et al. | |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 | 7/2013 | Pohl et al. | |
| 8,500,601 B2 | 8/2013 | Arnold et al. | |
| 8,584,359 B1 | 11/2013 | Bowman | |
| 8,727,944 B2 | 5/2014 | Noboru et al. | |
| 8,734,281 B2 | 5/2014 | Ai et al. | |
| 8,996,227 B2 | 3/2015 | Sisk et al. | |
| 9,017,207 B2 | 4/2015 | Pohl et al. | |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 | 8/2017 | Pohl et al. | |
| 9,829,103 B2 | 11/2017 | Volpert | |
| 9,862,260 B2* | 1/2018 | Lee | B60K 6/387 |
| 10,167,906 B2* | 1/2019 | Neelakantan | F16D 13/52 |
| 10,183,569 B2 | 1/2019 | Toyota et al. | |
| 10,422,389 B2 | 9/2019 | Ebihara | |
| 10,479,187 B2 | 11/2019 | Lubben et al. | |
| 10,487,918 B2 | 11/2019 | Turner et al. | |
| 10,518,626 B2 | 12/2019 | Pettersson | |
| 10,519,920 B2 | 12/2019 | Patil et al. | |
| 10,591,025 B2 | 3/2020 | Fliearman et al. | |
| 10,619,711 B2 | 4/2020 | Fliearman et al. | |
| 10,900,454 B1 | 1/2021 | Fliearman et al. | |
| 2001/0019210 A1 | 9/2001 | Fukasaku et al. | |
| 2001/0025621 A1 | 10/2001 | Shiraishi et al. | |
| 2001/0042649 A1 | 11/2001 | Maeda et al. | |
| 2002/0019284 A1 | 2/2002 | Aikawa et al. | |
| 2002/0033059 A1 | 3/2002 | Pels | |
| 2002/0117860 A1 | 8/2002 | Man et al. | |
| 2002/0139592 A1 | 10/2002 | Fukasaku et al. | |
| 2002/0177504 A1 | 11/2002 | Pels | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 | 5/2006 | Kefti-Cherif et al. | |
| 2006/0154771 A1 | 7/2006 | Klemen et al. | |
| 2006/0166777 A1 | 7/2006 | Aikawa et al. | |
| 2007/0108006 A1 | 5/2007 | Schmid et al. | |
| 2007/0157899 A1 | 7/2007 | Seufert et al. | |
| 2007/0265126 A1 | 11/2007 | Janson et al. | |
| 2008/0179119 A1 | 7/2008 | Grenn et al. | |
| 2008/0179159 A1* | 7/2008 | Pollman | F16D 13/30 60/435 |
| 2008/0612007 | 7/2008 | Ishii et al. | |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 | 12/2009 | Pohl et al. | |
| 2010/0029428 A1 | 2/2010 | Abe et al. | |
| 2010/0044183 A1 | 2/2010 | Guggolz et al. | |
| 2010/0048338 A1 | 2/2010 | Si | |
| 2010/0063704 A1 | 3/2010 | Okubo et al. | |
| 2010/0076634 A1 | 3/2010 | Brigham | |
| 2010/0190602 A1 | 7/2010 | Wittkopp et al. | |
| 2010/0234166 A1 | 9/2010 | Samie et al. | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0152026 A1 | 6/2011 | Williams | |
| 2011/0263379 A1 | 10/2011 | Liang et al. | |
| 2012/0103293 A1 | 5/2012 | Robinette et al. | |
| 2012/0165156 A1 | 6/2012 | Oguri | |
| 2012/0235473 A1 | 9/2012 | Jiang et al. | |
| 2012/0240723 A1 | 9/2012 | Gluckler et al. | |
| 2012/0316026 A1 | 12/2012 | Oguri et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 | 1/2014 | Pohl et al. | |
| 2014/0128205 A1 | 5/2014 | Phillips et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0143936 A1 | 5/2015 | Eo et al. | |
| 2015/0226323 A1 | 8/2015 | Pohl et al. | |
| 2015/0239335 A1 | 8/2015 | Wachter et al. | |
| 2016/0031438 A1 | 2/2016 | Matsui et al. | |
| 2016/0031439 A1 | 2/2016 | Nefcy et al. | |
| 2016/0052382 A1 | 2/2016 | Clark et al. | |
| 2016/0076629 A1 | 3/2016 | Modrzejewski et al. | |
| 2016/0082821 A1 | 3/2016 | Mueller et al. | |
| 2016/0096522 A1 | 4/2016 | Ortmann et al. | |
| 2016/0137045 A1 | 5/2016 | Zhu et al. | |
| 2016/0200311 A1 | 7/2016 | Nefcy et al. | |
| 2016/0207525 A1 | 7/2016 | Nefcy et al. | |

(56) References Cited

U.S. PATENT DOCUMENTS

| | | |
|---|---|---|
| 2016/0258495 A1 | 9/2016 | Bird |
| 2016/0288780 A1 | 10/2016 | Shukla et al. |
| 2016/0348741 A1 | 12/2016 | Niemiec et al. |
| 2017/0050508 A1 | 2/2017 | Pritchard et al. |
| 2017/0248196 A1 | 8/2017 | Turner et al. |
| 2017/0328470 A1 | 11/2017 | Pohl et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0112530 A1 | 4/2018 | Fliearman et al. |
| 2018/0149247 A1 | 5/2018 | Rekow et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176609 A1* | 6/2019 | Bando ................ B60K 17/356 |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1* | 11/2019 | Sato ...................... F16D 21/04 |
| 2020/0331337 A1 | 10/2020 | Fliearman et al. |
| 2020/0331338 A1 | 10/2020 | Fliearman et al. |
| 2020/0332754 A1 | 10/2020 | Fliearman et al. |
| 2020/0332756 A1 | 10/2020 | Fliearman et al. |
| 2020/0332757 A1 | 10/2020 | Fliearman et al. |
| 2020/0332864 A1 | 10/2020 | Fliearman et al. |
| 2020/0332865 A1 | 10/2020 | Fliearman et al. |
| 2020/0332866 A1 | 10/2020 | Fliearman et al. |
| 2020/0332867 A1 | 10/2020 | Fliearman et al. |
| 2020/0332868 A1 | 10/2020 | Fliearman et al. |
| 2021/0372503 A1 | 12/2021 | Fliearman et al. |
| 2021/0372504 A1 | 12/2021 | Fliearman et al. |
| 2022/0267990 A1 | 8/2022 | Fliearman et al. |
| 2022/0267991 A1 | 8/2022 | Dhanal et al. |

FOREIGN PATENT DOCUMENTS

| | | |
|---|---|---|
| DE | 3120675 A1 | 2/1982 |
| DE | 3444562 A1 | 6/1985 |
| DE | 69218975 T2 | 6/1994 |
| DE | 69008994 T2 | 12/1994 |
| DE | 10007959 A1 | 9/1998 |
| DE | 19745995 A1 | 9/1998 |
| DE | 19927521 A1 | 6/2000 |
| DE | 19911924 A1 | 9/2000 |
| DE | 19923316 A1 | 11/2000 |
| DE | 10003741 A1 | 4/2001 |
| DE | 10103726 A1 | 8/2002 |
| DE | 102006037576 A1 | 4/2008 |
| DE | 112007000573 T5 | 1/2009 |
| DE | 102010007612 A1 | 10/2010 |
| DE | 102010005178 | 11/2010 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 A1 | 3/2014 |
| DE | 102013203009 A1 | 8/2014 |
| DE | 102013012747 A1 | 9/2014 |
| DE | 102013206970 A1 | 10/2014 |
| DE | 102013209022 A1 | 11/2014 |
| DE | 102014200720 A1 | 2/2015 |
| DE | 102014200723 B3 | 2/2015 |
| DE | 102013219948 A1 | 4/2015 |
| DE | 102014225298 A1 | 7/2015 |
| DE | 112014000378 T5 | 9/2015 |
| DE | 112014000411 T5 | 10/2015 |
| DE | 102017203026 A1 | 8/2017 |
| DE | 102017204269 A1 | 9/2017 |
| DE | 112016004789 T5 | 7/2018 |
| DE | 102018122936 | 3/2020 |
| DE | 102019204909 A1 | 10/2020 |
| DE | 102020204705 A1 | 10/2020 |
| DE | 102020204795 A1 | 10/2020 |
| DE | 102022200804 A1 | 8/2022 |
| EP | 0384808 A1 | 9/1991 |
| EP | 645271 B1 | 3/1995 |
| EP | 0391386 B1 | 9/1995 |
| EP | 2272702 A2 | 1/2011 |
| EP | 2664785 | 11/2013 |
| EP | 1069310 B4 | 3/2014 |
| GB | 650564 | 2/1951 |
| GB | 2506199 A | 3/2014 |
| JP | 04296649 A | 10/1992 |
| JP | 2003267079 A | 9/2003 |
| JP | 2015116004 A | 6/2015 |
| WO | 1999023398 A2 | 5/1999 |
| WO | 0188369 A1 | 11/2001 |
| WO | 2007107458 A2 | 9/2007 |
| WO | 2012078203 A1 | 6/2012 |
| WO | 2018028745 | 2/2018 |

OTHER PUBLICATIONS

German Search Report issued in application No. DE102022206133.0 dated Oct. 12, 2022 with machine translation (26 pages).

USPTO non-final office action issued in pending Utility U.S. Appl. No. 17/080,562 dated Dec. 6, 2021.

NTN Automotive Sales Headquarters, Compact Clutch Integrated Pulley for Alternators, NTN Technical Review No. 75, 2007.

Harmonic Drive LLC, Harmonic Planetary Precision Gearing & Motion Control, Product Brochure, Mar. 2006.

Ioan-Adrian Viorel et al., Integrated Starter-Generators For Automotive Applications, Technical University of Cluj-Romania, Dept. of Electrical Machines, vol. 45, No. 3, 2004.

North Atalantic Starter, Starter Drives Explained, Northatlan.com, 2005.

German Search Report for application No. 1020172030267 dated Aug. 4, 2017.

German Search Report for application No. 1020182189080 dated May 27, 2019.

German Search Report for application No. 1020182214956 dated May 28, 2019.

German Search Report for application No. 1020182180784 dated Jun. 4, 2019.

German Search Report for application No. 1020202046468 dated Sep. 1, 2020.

German Search Report for application No. 1020202047057 dated Sep. 1, 2020.

German Search Report for application No. 1020202047952 dated Sep. 2, 2020.

German Search Report for application No. 1020202047049 dated Sep. 3, 2020.

German Search Report for application No. 1020202047065 dated Sep. 3, 2020.

German Search Report for application No. 1020202049433 dated Sep. 4, 2020.

German Search Report for application No. 1020202030634 dated Sep. 4, 2020.

German Search Report for application No. 1020202046425 dated Sep. 4, 2020.

USPTO Final Office Action dated Mar. 8, 2019 for Utility U.S. Appl. No. 15/056,767.

USPTO Final Office Action dated Jun. 11, 2018 for Utility U.S. Appl. No. 15/056,767.

USPTO Non-Final Office Action dated Sep. 9, 2019 for Utility U.S. Appl. No. 15/834,356.

USPTO Non-Final Office Action dated Nov. 2, 2017 for Utility U.S. Appl. No. 15/056,767.

USPTO Non-Final Office Action dated Sep. 28, 2018 for Utility U.S. Appl. No. 15/056,767.

(56) References Cited

OTHER PUBLICATIONS

USPTO Non-Final Office Action dated Nov. 1, 2018 for Utility U.S. Appl. No. 15/825,520.
USPTO Non-Final Office Action dated Feb. 25, 2019 for Utility U.S. Appl. No. 15/834,356.
USPTO Non-Final Office Action dated Mar. 4, 2020 for Utility U.S. Appl. No. 16/385,934.
USPTO Non-Final Office Action dated Jun. 19, 2020 for Utility U.S. Appl. No. 16/386,075.
USPTO Non-Final Office Action dated Aug. 24, 2020 for Utility U.S. Appl. No. 16/385,964.
USPTO Non-Final Office Action dated Aug. 24, 2020 for Utility U.S. Appl. No. 16/385,784.
USPTO Non-Final Office Action dated Nov. 4, 2020 for Utility U.S. Appl. No. 16/385,860.
USPTO Non-Final Office Action dated Oct. 30, 2020 for Utility U.S. Appl. No. 16/386,052.
Deere & Company, Utility U.S. Appl. No. 17/032,114, filed Sep. 25, 2020.
Deere & Company, Utility U.S. Appl. No. 16/887,973, filed May 29, 2020.
Deere & Company, Utility U.S. Appl. No. 16/887,998, filed May 29, 2020.
Deere & Company, Utility U.S. Appl. No. 17/080,562, filed Oct. 26, 2020.
Deere & Company, Utility U.S. Appl. No. 17/185,692, filed Feb. 25, 2021.
Deere & Company, Utility U.S. Appl. No. 17/185,713, filed Feb. 25, 2021.
Deere & Company, Utility U.S. Appl. No. 17/216,243, filed Mar. 29, 2021.
Non-Final Office Action issued in U.S. Appl. No. 17/216,243 dated Dec. 13, 2022, 22 pages.
German Search Report issued in application No. DE 102021209339.6 dated Feb. 15, 2022 with translation, 17 pages.
USPTO non-final office action issued in pending Utility U.S. Appl. No. 16/887,973 dated Jan. 31, 2022.
German Search Report issued in German Application No. 102021113913.9 dated Sep. 30, 2021. (8 pages).
German Search Report issued in application No. DE102022200804.9 dated Sep. 22, 2022 with machine translation (20 pages).
German Search Report issued in application No. DE102022200825.1 dated Sep. 27, 2022 with machine translation (26 pages).
USPTO Non-Final Office Action dated May 13, 2022 for Utility U.S. Appl. No. 17/185,713.
German Search Report issued in application No. DE102022203350.7 dated Jan. 17, 2023 (12 pages).
USPTO Non-Final Office Action issued in U.S. Appl. No. 17/185,692 dated Apr. 21, 2023 9 pages.

* cited by examiner

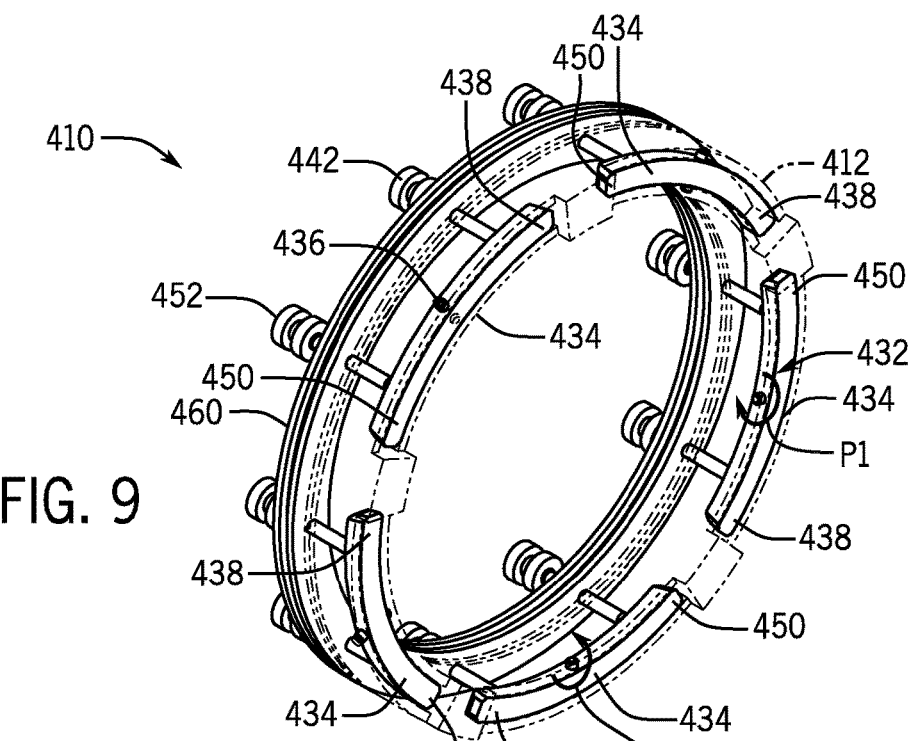

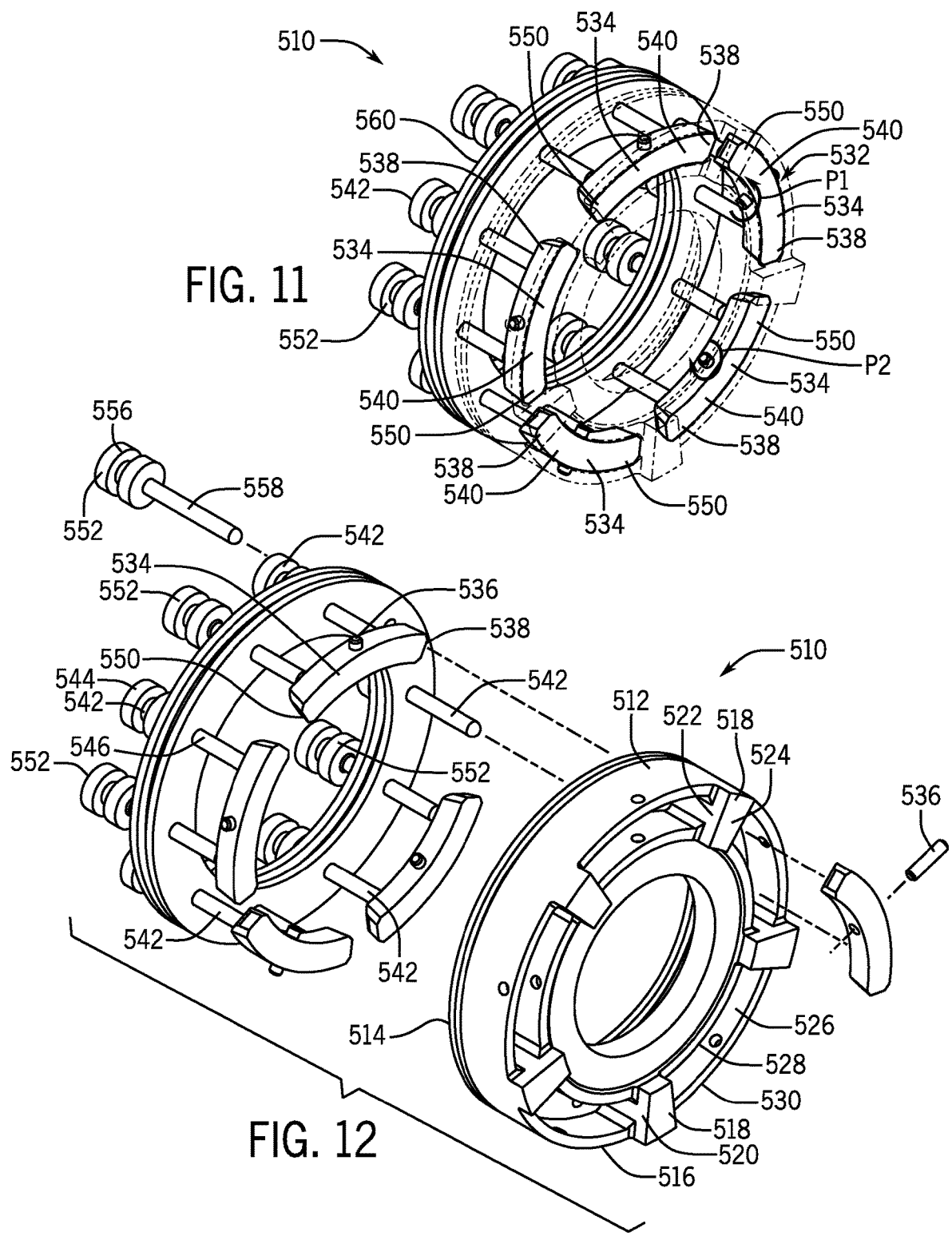

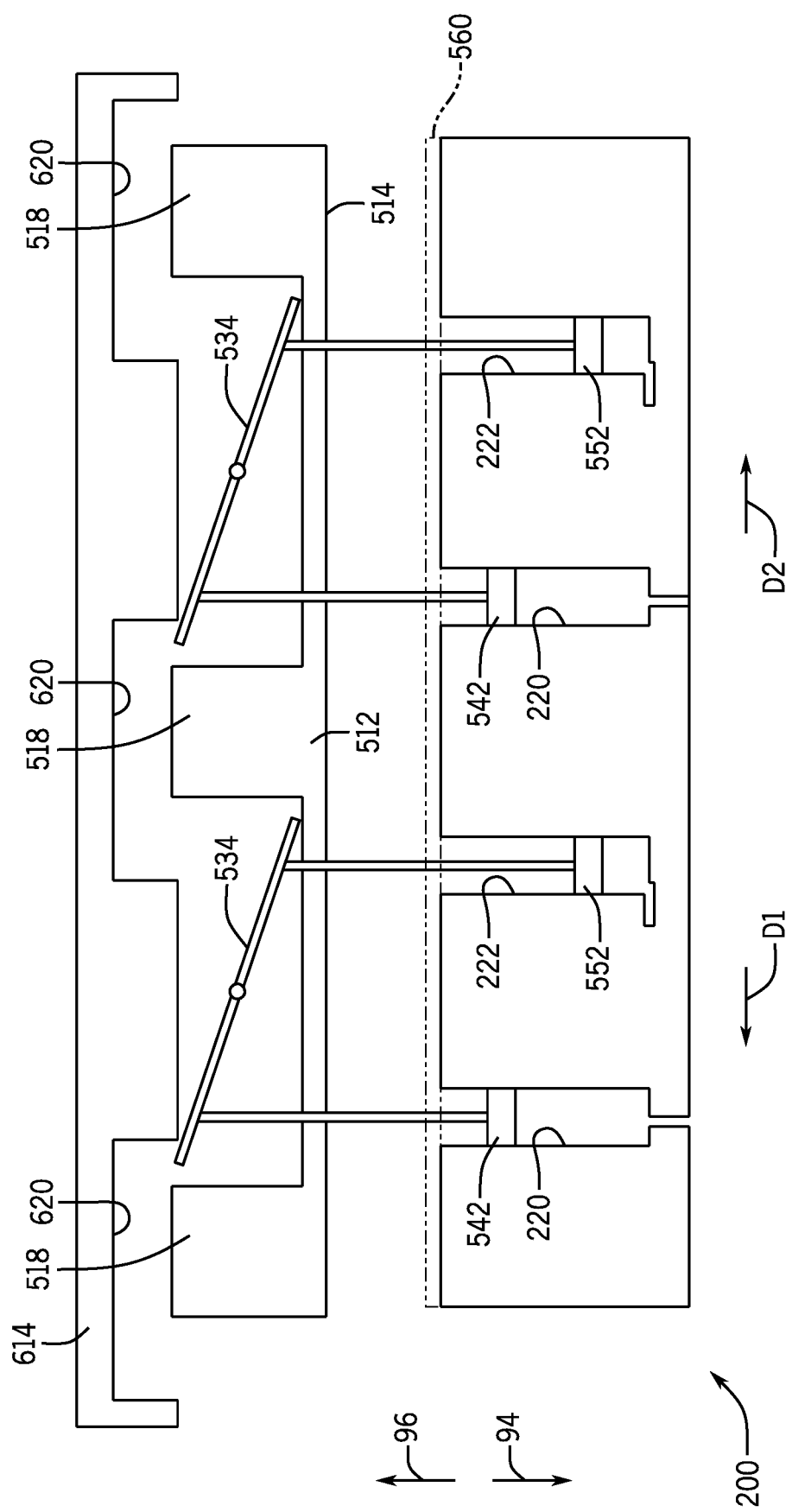

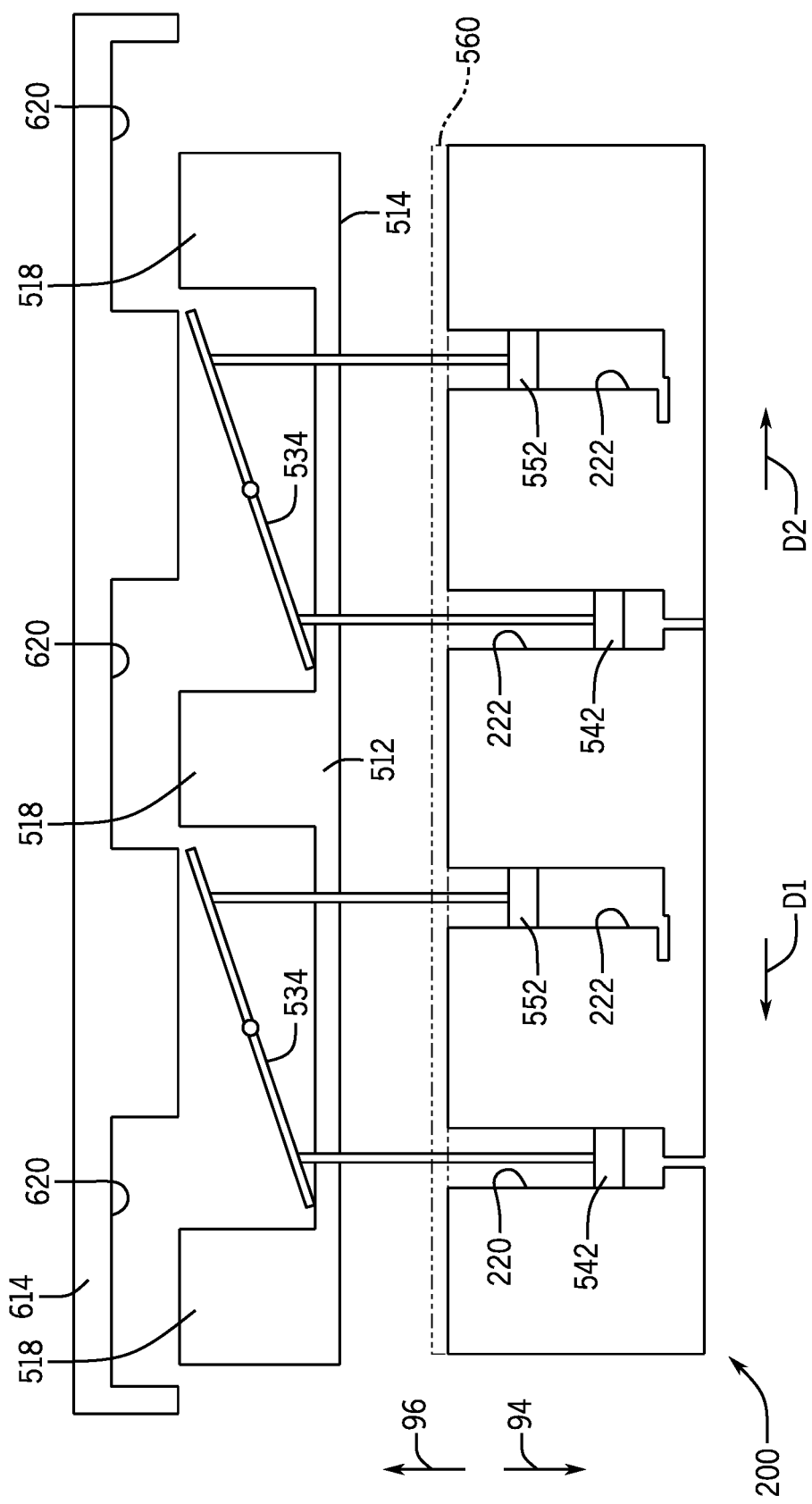

WORK VEHICLE MULTI-SPEED DRIVE ASSEMBLY WITH GUIDED DOG CLUTCH

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle drive systems, including drive assemblies for effecting multi-speed rotational outputs via guided clutch operations.

BACKGROUND OF THE DISCLOSURE

Work vehicles, such as those used in the agriculture, construction and forestry industries, and other conventional vehicles, may be powered by an internal combustion engine (e.g., a diesel engine) and/or one or more electric power sources (e.g., electric motors). Various drive arrangements may be employed in the vehicle to effect power transfer from the prime or secondary power sources. For example, the vehicle power and drive line may include one or more drive assemblies to effect one or more output speeds for operating certain vehicle components. For example, wheel end drives, final drives and the like may provide one or more gear ratios to transfer terminal or near terminal power to the tractive ground-engaging wheels or tracks of the vehicle. Efficient and smooth operation through the speed and torque ranges required of such drives is desirable.

SUMMARY OF THE DISCLOSURE

This disclosure provides a multi-speed drive assembly such as may be used in work vehicles (e.g., as tractive wheel drives).

In one aspect, the disclosure provides a drive assembly for a work vehicle including a drive housing including a first housing element forming a reaction member, a drive shaft rotatable about a drive axis relative to the reaction member in a first rotation direction and alternatively a second rotation direction, an inner hub rotationally fixed to the drive shaft and a planetary gear set coupled to the drive shaft and configured to selectively rotate an output element in the first rotation direction and in the second rotation direction. The drive assembly also includes one or more clutch arrangements comprising a clutch ring configured to selectively engage the planetary gear set to effect a rotation speed of the output element, the one or more clutch arrangement further including a guide assembly mounted on the clutch ring. The guide assembly is configured to selectively interact with the planetary gear set to effect disengagement of the clutch ring from the planetary gear set. The drive assembly further includes one or more clutch actuation assemblies configured to effect movement of the one or more clutch arrangements along the drive axis to selectively engage the planetary gear set, and one or more guide actuation assemblies configured to operate the guide assembly to interact with the planetary gear set to effect disengagement of the one or more clutch arrangements.

In another aspect, the disclosure provides a drive assembly for a work vehicle including a housing arrangement having a first housing element forming a reaction member, the first housing element having a mounting portion, a wall portion and a low chamber arranged between a first inner wall and a first outer wall of the wall portion. The drive assembly also includes a drive shaft rotatable on a drive axis extending through the housing arrangement, an inner hub rotatably fixed to the drive shaft, the inner hub having a high chamber arranged between a second inner wall and second outer wall, and a planetary gear set coupled to the drive shaft and configured to selectively rotate an output element. The planetary gear set includes a sun gear coupled to drive shaft, a set of planet gears engaged with the sun gear, a planet carrier to which the planet gears are mounted and a ring circumscribing and engaged with the planet gears. The drive assembly also includes a low clutch arrangement and a high clutch arrangement. The low clutch arrangement is coupled to the first housing element and is at least partially arranged in the low chamber. The low clutch arrangement includes a low clutch ring repositionable in the low chamber between a disengaged position and an engaged position relative to the planet carrier, and a low guide assembly mounted in the low clutch ring. The low guide assembly includes a plurality of low guides configured to selectively interact with the planet carrier to effect disengagement of the low clutch ring from the planet carrier. The high clutch arrangement is coupled to the inner hub and at least partially arranged in the high chamber. The high clutch arrangement includes a high clutch ring repositionable in the high chamber between a disengaged position and an engaged position relative to the planet carrier, and a high guide assembly mounted to the high clutch ring. The high guide assembly includes a plurality of high guides configured to selectively interact with the planet carrier to effect disengagement of the high clutch ring from the planet carrier.

The details of one or more embodiments are set forth in the accompanying drawings and the description below. Other features and advantages will become apparent from the description, the drawings, and the claims.

BRIEF DESCRIPTION OF THE DRAWINGS

FIG. 9 is an isometric view of a low clutch arrangement of the drive assembly of FIGS. 3 and 4;

FIG. 10 is an exploded view of the low clutch arrangement of FIG. 9;

FIG. 11 is an isometric view of a high clutch arrangement of the drive assembly of FIGS. 3 and 4;

FIG. 12 is an exploded view of the high clutch arrangement of FIG. 11;

FIGS. 17A-17H are diagrams showing example operations of the high clutch arrangement relative to the portion of the gear set of the drive assembly of FIGS. 3 and 4;

Like reference symbols in the various drawings indicate like elements.

DETAILED DESCRIPTION

Figure 1:
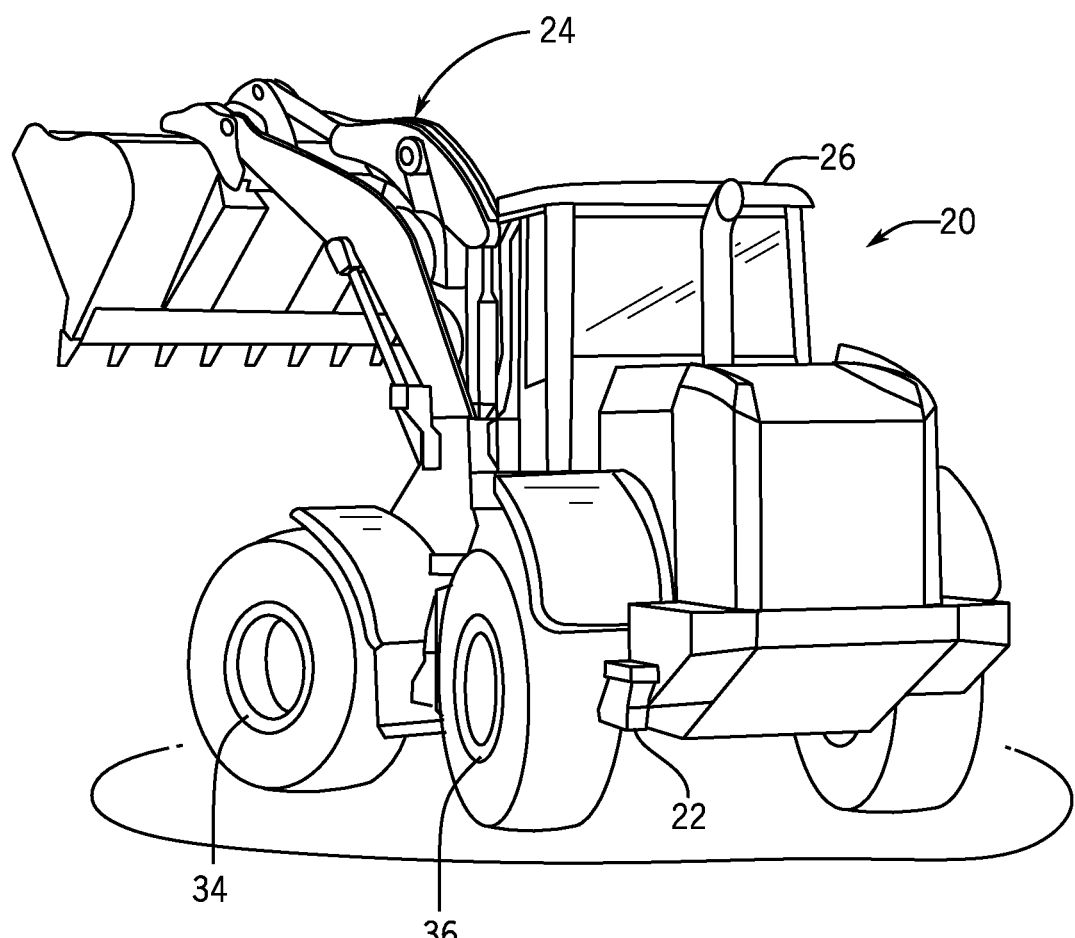
FIG. 1 is a schematic side view of an example work vehicle in the form of a wheel loader in which the disclosed drive assembly may be employed.

The following describes one or more example embodiments of the disclosed bi-directional drive assembly, as shown in the accompanying figures of the drawings described briefly above. Various modifications to the example embodiments may be contemplated by one of skill in the art.

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Overview

Generally, the disclosure provides a drive assembly that is selectively or alternatively operable in either rotational clock direction at the input and output sides of the drive assembly. Without changing internal or external components, the drive assembly may receive rotational input power and transmit rotational output power in either clock direction, as desired, using the drive signal to the power source (e.g., electric machine) to control output rotation direction. Multiple such drive assemblies with common internal and external hardware may thus be employed for oppositely facing shafts that are required to rotate in opposite clock directions to collectively effect one motion of the vehicle or subsystem thereof, such as to provide a tractive force in opposite clock directions to ground-engaging wheels or tracks at opposite sides of the vehicle to collectively propel the vehicle either in a forward or the rearward travel direction. In one example implementation, the bi-directional drive assembly may be employed in a common configuration for wheel end drive units for all wheels of the vehicle.

In certain embodiments, the drive assembly is or includes a power transmission assembly with a gear set that is driven by a power source, such as one or more electric machines or hydraulic motors. The gear set transmits rotational power from the power source to a rotating output member. The output member may be an intermediate component or tied directly to the driven component. The gear set may effect a ratio change between the input power source and the output member, directly transmit the power without a change in ratio, or a combination thereof. The output member may thus rotate at the same speed as, or one or more different speeds than, the input power source or input shaft. The gear set may take any of various forms including arrangements with enmeshing spur or other gears as well as arrangements with one or more planetary gear sets. Large gear reduction ratios may be achieved by the drive assembly such that a single electric machine or hydraulic motor may be used and operated at suitable speeds for one or more speed and torque outputs. However, multiple electric machines or hydraulic motors may power the drive assembly.

Further, in certain embodiments, the drive assembly may automatically and/or selectively shift gear ratios (i.e., shift between power flow paths having different gear ratios). The drive assembly may include one or more active engagement components that engage or disengage to effect power transmission through a power flow path. In this manner, clutch arrangements may be employed to carry out the ratio changes with appropriate control hardware and logic. In various embodiments, the clutch arrangements may have one or more positive interlocking shifting type clutches, possibly referred to as "dog" clutches, in which raised features (e.g., axially extending projections) of the clutches engage and disengage corresponding raised features or move into and out of corresponding recesses in mating components of the gear set. In the case of male/female mating features, a reverse relationship may exist (e.g., the clutches define the recesses receiving raised projections of the gear set). Moreover, one or more clutches may serve to engage and disengage interlocking features of two or more components of a planetary gear set, such that one or more clutch components do not have interlocking features themselves.

Selective engagement and disengagement of the clutch arrangements with a planetary gear set grounds one or more components thereof to effect one or more gear ratios and corresponding output rotation speeds and torques. The clutch arrangements may be permanently coupled to a reaction member, for example of a drive assembly housing, such that actuating components may be fixedly mounted to the drive assembly without the need for actuation of moving gear set components and the corresponding service lines (e.g., hydraulic passages or lines). Actuation components may also be mounted fixed relative to the reaction member to further reduce or eliminate service lines to non-stationary components. Selective engagement of the multiple clutch elements by the actuation components thereby allows the drive assembly to output multiple output speeds and torques.

In one example, the clutch arrangements include a first clutch arrangement and a second clutch arrangement selectively actuated to engage a planetary gear set. Engagement of the first clutch arrangement grounds a component of the planetary gear set to effect a first gear ratio and corresponding first output rotation speed and first torque. Engagement of the second clutch arrangement rotationally fixes components of the planetary gear set to the drive shaft to effect a second gear ratio and corresponding second output rotation speed and second torque. Such a multi-speed drive assembly may thus effect different speeds by selectively grounding or fixing different components of the planetary gear set. In that case, the second rotation speed of an output element may be greater than the first rotation speed of the output element. In one or more implementations, one of the rotation speeds of the output element (e.g., the second rotation speed) may match the rotation speed and direction of the drive shaft, thereby providing a direct drive mode with a 1:1 gear ratio.

In one or more further examples, the planetary gear set includes a sun gear coupled to the drive shaft, a planet carrier, a set of planet gears and a ring gear coupled to the output element. The first clutch arrangement may engage a first portion of the planet carrier to interface with the reaction member to effect the first rotation speed of the output element. The second clutch arrangement may engage a second portion of the planet carrier to interface with the output element (e.g., a cover of the planetary gear set), or another member coupled for co-rotation therewith, to effect the second rotation speed.

One or more of the clutch arrangements also include a guide assembly selectively operable to effect disengagement of the clutch arrangement from the planetary gear set. In some examples, the guide assembly is operable to effect disengagement during relative rotation between the clutch arrangement and the planetary gear set in first clock direction. In other examples, the guide assembly is operable to effect disengagement during relative rotation between the clutch arrangement and the planetary gear set in either the first clock direction or a second clock direction. In this manner, a single clutch ring of a clutch arrangement may be disengaged from the planetary gear set in response to relative rotation between the clutch ring and the planetary gear in either a first clock direction and/or a second clock direction.

In certain embodiments, an actuation arrangement includes a number of hydraulic actuators (that convert fluid pressure into a mechanical linear push and/or pull force) that function to engage and/or disengage the clutch arrangements. In one example, one or more hydraulic actuators may be used to reposition a clutch ring of a clutch arrangement. Different types of actuators may be used in combination to reposition clutch rings of the clutch arrangements. Various implementations are encompassed by this disclosure. Further, in certain embodiments, the actuation arrangement includes hydraulic actuators that function to operate one or more guide assemblies to effect disengagement of the clutch arrangements.

As used herein with respect to the hydraulic and other type of actuators, the term "activated," "energized" or "pressurized" refers to a command that results in the associated hydraulic actuator increasing fluid pressure in a cylinder, chamber, recess, or the like, to apply a force on a movable piston arranged in the cylinder, chamber, recess, or the like to drive movement of the piston. In one example, an energize command for the hydraulic actuators results in the respective pistons being pushed out of or pulled into the cylinder, chamber or the like. It is also possible to operate the hydraulic actuators by discontinuing pressurized fluid such that a spring pushes/pulls the piston relative to the cylinder, chamber or the like. In some examples, the hydraulic actuator may include a piston-cylinder or piston-chamber assembly of the type described, whereby movement of the piston effects movement of a clutch ring in a clutch arrangement and/or operates a guide assembly of a clutch arrangement. Alternatively, the hydraulic actuator may provide pressurized fluid to act directly on a clutch ring and/or a guide pin of a guide assembly arranged in a cylinder, chamber or the like. In one example, the clutch ring functions as a piston movable within the cylinder, chamber, or the like in response to the cylinder, chamber or the like being pressurized.

The drive assembly disclosed herein may be useful for any number of work or conventional vehicle applications. In the work vehicle context, the drive assembly may power various sub-systems including various aspects of the power and drive trains of the vehicle. As one example, the drive assembly may be or be incorporated into a wheel drive for providing tractive power to the ground-engaging wheels or tracks of the vehicle. The drive assembly may be incorporated into the power and drive train at an intermediate location between the wheels/tracks and the prime mover or transmission, or it may be at the wheel/track ends (e.g., one at each ground-engaging wheel or track) in which case the drive assembly may be considered a "final drive" that couples directly or through a downstream gearset to the wheel or track carrying hub. In such a case when the drive assembly is remote from the prime mover, a secondary power source, such as one or more electric machines or hydraulic motors provide the immediate power input to the drive assembly.

The following describes one or more example implementations of the disclosed drive assembly. Discussion herein may sometimes focus on the example application of a wheel end drive assembly of a wheel loader, but the disclosed drive assembly is suitable for other types of components and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles.

Example Work Vehicle Multi-Speed Drive Assembly with Guided Dog Clutch

Figure 2A:
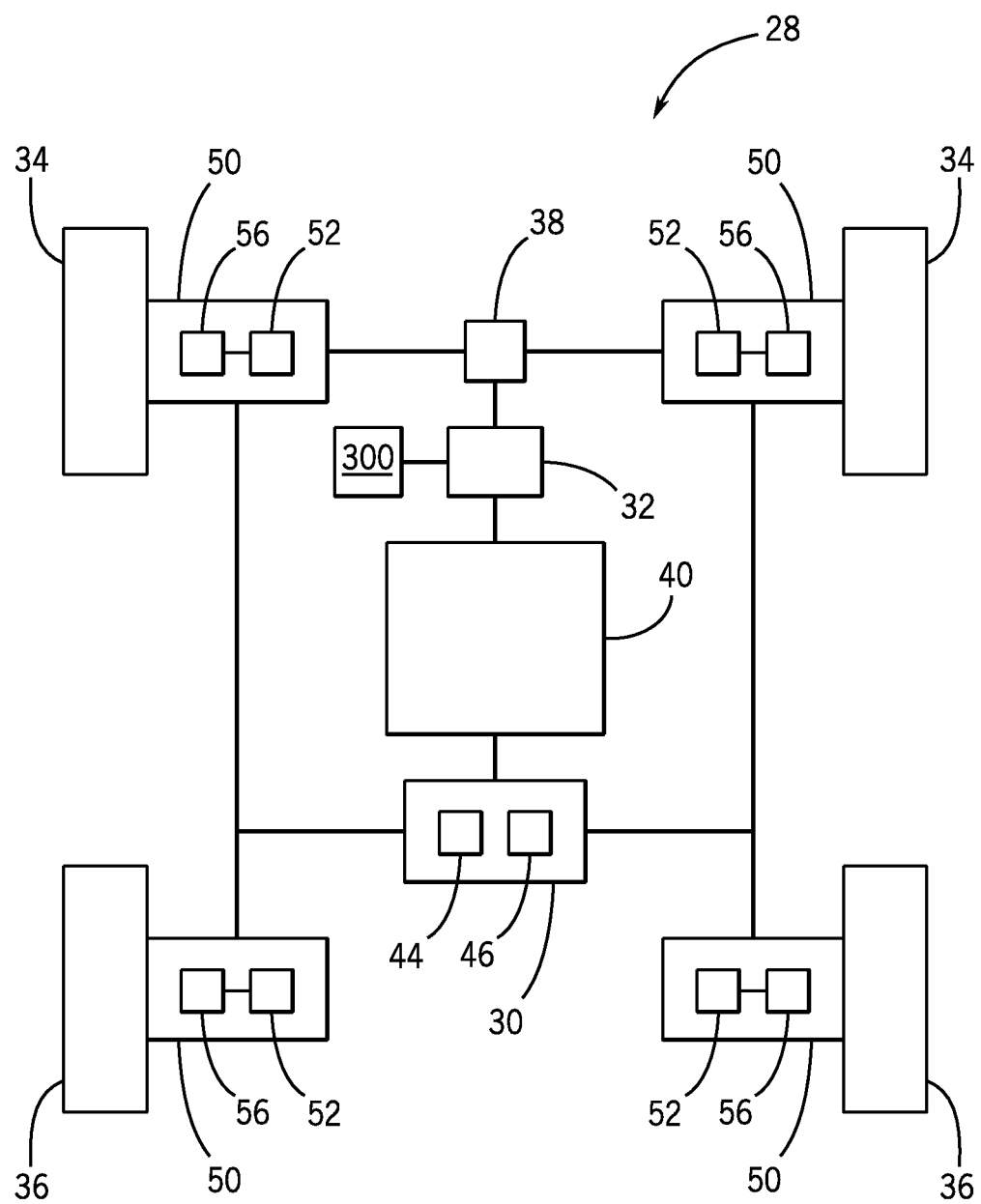
FIG. 2A is a schematic diagram of certain components of a power and drive train for the example work vehicle of FIG. 1.

Referring to FIGS. 1 and 2A, in some embodiments, the disclosed work vehicle 20 may be a wheel loader although, as noted, the drive assembly described herein may be applicable to a variety of machines. As shown, the work vehicle 20 may be considered to include a structural main frame or chassis 22 supporting a work implement 24 that is selectively positioned by various combinations of structural elements (e.g., arms, crossbars, pivot joints, etc.) and controllably moved utilizing any number of actuators, such as hydraulic cylinders. The work vehicle 20 may further be considered to include an operator cabin 26, a power and drive train 28, a control system 30, and a hydraulic system 32. The work vehicle 20 may be supported off the ground by ground-engaging wheels or tracks. In the illustrated example, the work vehicle 20 includes a front axle with steerable front wheels 34 (one at each left or right lateral side of the work vehicle 20) and a rear axle with non-steerable rear wheels 36 (one or more at each left or right side of the work vehicle 20).

With further reference to FIG. 2A, the power and drive train 28 has wheel steering components 38, including various devices (e.g., power steering pumps and lines, steering mechanisms, and the like) that couple manual (e.g., operator steering controls or wheel) and/or automated (via the control system 30) steering input to the wheels, such as the steerable wheels 34. The power and drive train 28 includes a prime mover, such as an engine 40, which supplies power to the work vehicle 20, as either direct mechanical power or after being converted to electric or hydraulic power. In one example, the engine 40 is an internal combustion engine, such as a diesel engine, having an engine shaft for outputting mechanical power. The engine 40 is controlled by an engine control module (not shown) of the control system 30. It should be noted that the use of an internal combustion engine is merely an example, as the prime power source may one or more fuel cells, electric motors, hybrid-gas electric motors, or other power-producing devices.

The engine 40 provides power to onboard mechanical, electrical and hydraulic subsystems of the work vehicle 20 governing such things as tractive power to propel the work vehicle 20 and for off-boarding power to other sub-systems remote from the work vehicle 20. For example, the engine 40 may provide mechanical power that is converted to an electric format to run the electronics of the control system 30 and one or more electric drives of the work vehicle 20. The control system 30 thus may have mechanical to electrical power conversion components 44, one or more batteries 46, and associated electronics, including various alternators, generators, voltage regulators, rectifiers, inverters, and the like. The control system 30 may be configured as a computing device or electronic control unit (ECU) with associated processor devices and memory architectures, as a hard-wired computing circuit (or circuits), as a programmable circuit, as a hydraulic, electrical, or electro-hydraulic controller.

The control system 30 may be configured to execute various computational and control functionality with respect to the work vehicle 20, including various devices associated with the power and drive train 28, the hydraulic system 32, and various additional components of the work vehicle 20. In some embodiments, the control system 30 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 30 is configured to operate various aspects of the disclosed drive assembly, including electromechanical actuators (e.g., solenoids), which may form part of the power and drive train 28 or part of another subsystem of the work vehicle 20.

In some embodiments, the control system 30 may include or be configured to receive input commands from, or otherwise interface with, a human-machine interface or operator interface (not shown) and various sensors, units, and systems onboard or remote from the work vehicle 20. In response, the control system 30 may generate one or more types of commands for implementation by various systems of the work vehicle 20. The control system 30 may additionally or alternatively operate autonomously without input from a human operator, communicating with other systems or devices (including other controllers) in various known ways, including via a CAN bus (not shown), via wireless or hydraulic communication means, or otherwise. In one example and as discussed in greater detail below, the control system 30 may command current to electromagnets associated with an actuator assembly to engage and/or disengage clutches within the drive assembly.

The engine 40 may also provide mechanical power that is converted to hydraulic format to power various hydraulic drives, pumps and compressors that pressurize fluid to drive various actuators of the hydraulic system 32 in order to power components of the work vehicle 20, such as the work implement 24, wheel steering and braking, a tow-behind work implement (not shown), or the like. In this example, the work vehicle 20 supports the mounting of the work implement 24 as a loader with linkage boom arms and a bucket that may be raised and lowered during operation by one or more hydraulic piston-cylinder devices. The hydraulic system 32 may be coupled to and operated by the control system 30 autonomously or in response to commands from an operator input device (e.g., operator controls, operator display device, etc.) in the cabin 26 or remote from the work vehicle 20. The hydraulic system 32 may include other components (e.g., valves, flow lines, pistons/cylinders, seals/gaskets, and so on), such that control of various devices may be effected with, and based upon, hydraulic, mechanical, or other signals and movements. In some examples, the hydraulic system 32 includes, in part or in whole, or is hydraulically connected to, one or more actuators for effecting movements of one or more clutch arrangements and/or portions of the clutch arrangements in the drive assembly. That is, various components of the hydraulic system 32 operable to pressurize and/or depressurize a cylinder, chamber, recess, or the like for effecting movements of a clutch arrangement may be considered as an actuator for that clutch arrangement. Further, in some examples, various components of the hydraulic system 32 (e.g., pumps, valves, flow lines and the like) may be shared between various actuators.

As noted above, the drive assembly of this disclosure may be implemented in various subsystems within the work vehicle context and may be powered in one or more formats. The following describes one example drive assembly implemented as, and incorporated within, an electric wheel end drive 50. One such wheel end drive 50 is installed just upstream from each of the four wheels 34, 36 of the work vehicle 20. Each wheel end drive 50 itself, or one or more components thereof, may thus be considered a "final" drive due to its location proximate the associated wheel 34, 36 and its functioning to provide the last or nearly last gear ratio for the associated wheel 34, 36. The wheel end drives 50 may differ at each or pairs (e.g., front and rear) of the wheels 34, 36. However, due to the bi-directional functionality of the drive assembly, the wheel end drives 50 are identical for all wheels 34, 36, and as such, only one will be detailed below. Moreover, while the example wheel end drive 50 is electric, it may be operated by a different input power format (e.g., hydraulic or mechanical). The example wheel end drive 50 is also described herein as having multiple (e.g., two) electric machines for input power. However, the wheel end drive 50 may be operated with one or more than two electric machines. In the former case, intermediate input gearing may be utilized or omitted depending on the operating parameters (e.g., speed and torque) of the electric machine and/or the drive assembly itself and the wheels 34, 36. As will be described, intermediate input gearing is used to couple power to the drive assembly when two or more electric machines are employed. Additionally, the example wheel end drive 50 is a multiple-mode drive operable to output multiple speed and torque ranges for tractive power to the wheels 34, 36. Thus, while the engine 40 supplies prime power for the electric machine(s), the wheel end drives 50 are the direct power (and speed and torque) influencers to the wheels 34, 36, such that a central range transmission, axles or other upstream speed- and torque-changing gearing may be, and in the example implementation is, omitted from the work vehicle 20.

Figure 2B:
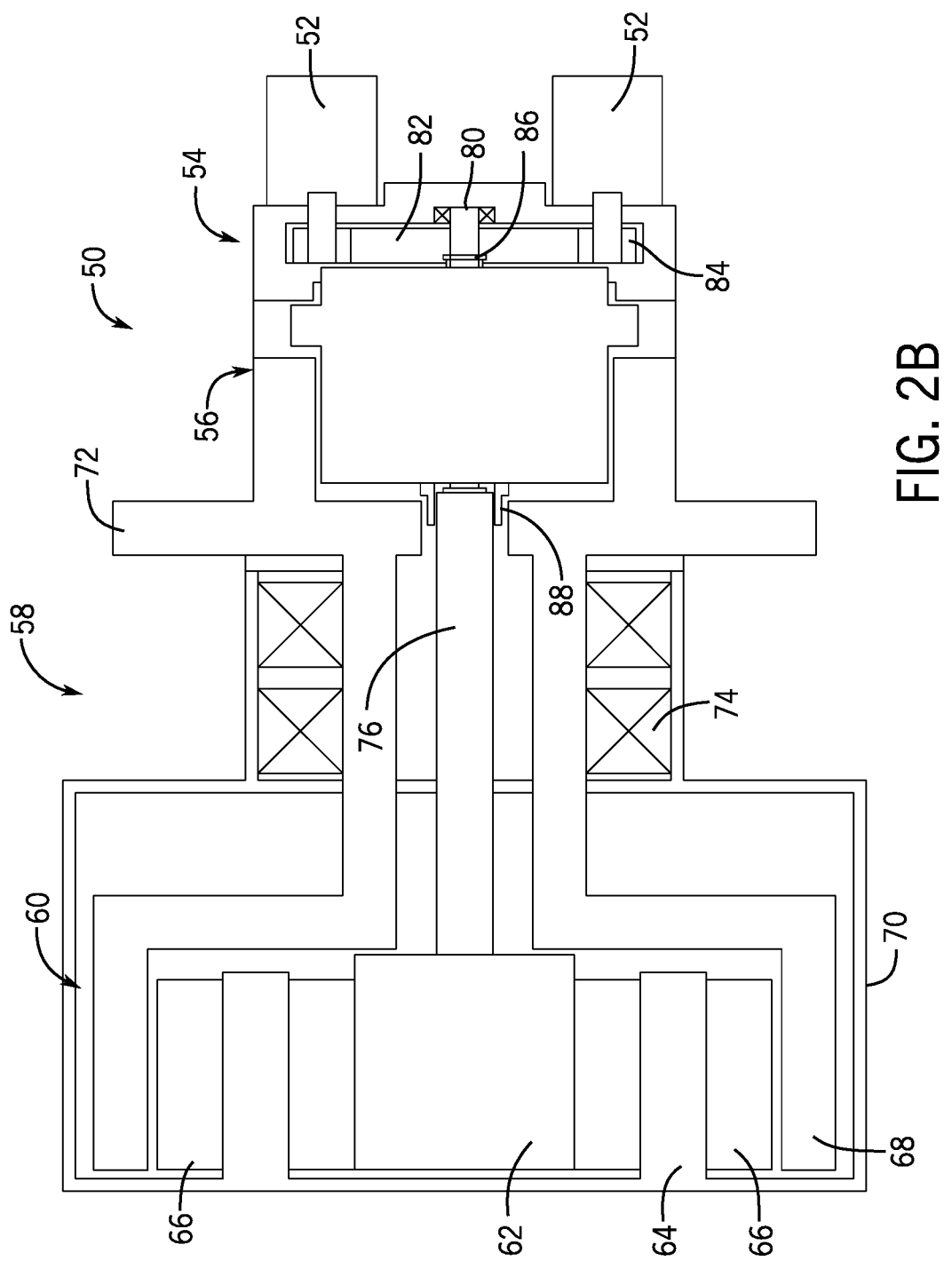
FIG. 2B is a schematic diagram of an example wheel end drive implementation of the disclosed drive assembly that may be incorporated in the example work vehicle of FIG. 1.

Referring also to FIG. 2B, the example wheel end drive 50 includes as principal components the input power sources in the form of two electric machines 52 that couple via an input gear set 54 to a drive assembly 56, which in turns couples to and drives one of the wheels 34, 36 via an outboard wheel end 58. The outboard wheel end 58 may be configured in any way suitable to mount the associated wheel 34, 36. Depending on speed and torque requirements of the wheel end drive 50, the outboard wheel end 58 may contain an outboard gear set, such as a single stage planetary gear set 60 having a sun gear 62 and a carrier 64 that supports planet gears 66 that mesh with a ring gear 68. The carrier 64 may be fixed to a wheel hub (not shown) of the associated wheel 34, 36 directly, or the carrier 64 may be contained within an outboard wheel end housing 70 that couples to the wheel hub. The ring gear 68 may be fixed to or formed integral with a mounting flange 72. The example outboard gear set 60 is a sun-in, carrier out planetary arrangement, although various other configurations are envisioned, including the omission of an outboard gear set or the carrier and/or the outboard wheel end housing 70 being formed by or directly coupled to the wheel hub of the wheel 34, 36. The wheel end drive 50 is assembled to the vehicle chassis 22, such as by the mounting flange 72, in a fixed orientation in the case of the rear wheels 36 or pivotally, about an upright, generally vertical or vertically canted, steering axis (not shown), in the case of the steered front wheels 34. One or more wheel bearings 74 allow the carrier 64 and/or outboard wheel end housing 70 to rotate relative to the vehicle chassis 22 about a generally lateral, or side to side, fixed or pivotal drive or rotation axis. The outboard wheel end 58 rotates about the rotation axis under power output from the drive assembly 56 via output shaft 76 coupled to or formed integrally with the sun gear 62 of the outboard planetary gear set 60. The drive assembly 56 is powered through an input shaft 80 splined to a central input gear 82, which meshes with relatively small diameter shaft gears 84 rotated by the electric machines 52. As noted, the input side of the wheel end drive 50 may be implemented in various ways, including with a different input gear set (e.g., a different axial gear set or a single or double stage planetary gear set), by a single electric machine with or without an input gear set (e.g., direct shaft mounting of the electric machine to the drive assembly), by more than two electric machines with a modified input gear set of any suitable axial, planetary or other gear configuration, and by a power source of a different format (e.g., mechanical or hydraulic). The input side as well as the outboard wheel end 58 of the wheel end drive 50 may be configured as needed to provide a 1:1 or other gear ratio between the electric machines 52 and the drive assembly 56 and between the drive assembly 56 and the wheel hub as needed depending, at least in part, on the desired speed and torque at the wheel 34, 36 and the speed and torque capacity of the electric machines 52.

The drive assembly 56 includes one or more actuator assemblies, one or more clutch arrangements and a gear set within a housing. Generally, the drive assembly 56 operates to transfer power (rotational speed and torque) from the electric machines 52 to the outboard wheel end 58 at each wheel 34, 36 at multiple gear ratios that are selected based on the status of the clutch arrangements, which are controlled by the actuator assemblies based on signals from the control system 30. In this example, the drive assembly 56 transfers power from an input element 86 coupled to the electric machines 52 to an output element 88 coupled to the outboard wheel end 58, generally along a rotation axis.

Referring generally to FIGS. 3-19, the drive assembly 56 includes a housing arrangement 100 which houses, or is connected to, one or more actuation assemblies 300 or one or more portions of the actuation assemblies 300, one or more clutch arrangements 400, and a gear set 600. A drive shaft 90 extends in the housing arrangement 100 and is configured for rotation in either clock direction (i.e., clockwise or counterclockwise) on a drive axis 92. The drive shaft 90 is coupled to the gear set 600 to transmit rotation to the gear set 600. The drive shaft 90 may be rotationally fixed to a clutch arrangement of the one or clutch arrangements 400 as well. The drive shaft 90 may also be coupled between the input element 86 and the output element 88. In some examples, the drive shaft 90 may be formed as part of the input element 86 and/or the input shaft 80.

The one or more actuation assemblies 300 are configured to interact with corresponding clutch arrangements of the one or more clutch arrangements 400 to reposition the corresponding clutch arrangement from a disengaged position relative to the gear set 600 to an engaged position relative to the gear set 600, and/or from the engaged position relative to the gear set 600 to the disengaged position relative to the gear set 600. In this manner, the one or more clutch arrangements 400 may be selectively engaged with (i.e., coupled to), or disengaged from (i.e., decoupled from), the gear set 600 to effect a ratio change and in turn, effect different output rotation speeds and torques.

Figure 3:
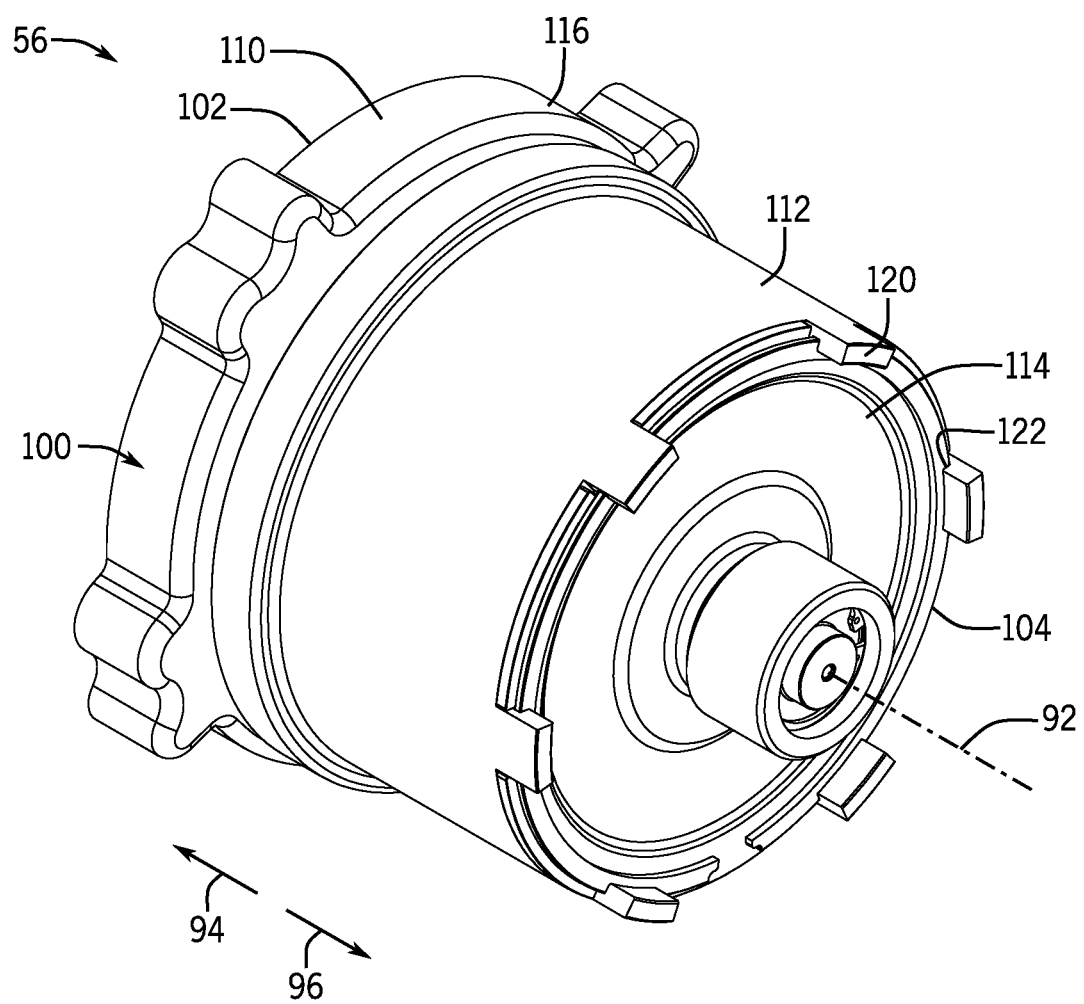
FIG. 3 is an isometric side view of the drive assembly that may be implemented in the work vehicle of FIG. 1.
Figure 4:
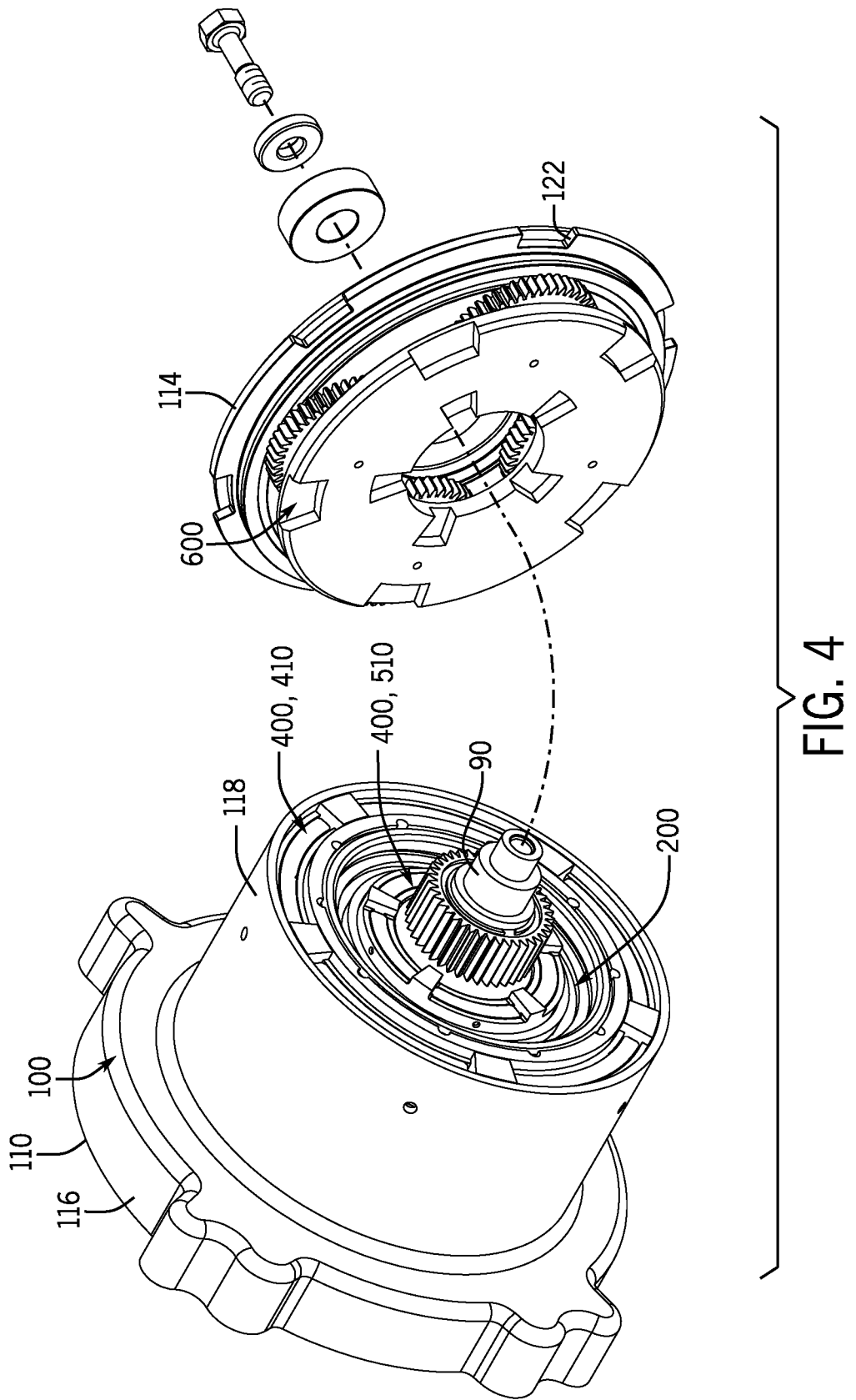
FIG. 4 is a partial exploded view of the drive assembly of FIG. 3.

As shown in FIGS. 3 and 4, in one example, the housing arrangement 100 of the drive assembly 56 is generally formed by one or more housing elements, at least one of which functions as a reaction member. For example, the housing arrangement 100 may include a first housing element 110, a second housing element 112 and a third housing element 114. The first housing element 110 is generally arranged at a first end 102 of the housing arrangement 100 and may house portions of the one or more actuation assemblies 300 and/or the one or more clutch arrangements 400. The first housing element 110 includes a mounting portion 116 at the first end 102 and a wall portion 118 extending from the mounting portion 116.

The first housing element 110 also functions as a reaction member that is fixed axially and radially with respect to the rotation (drive) axis 92, such that at least in the case of the rear non-steered wheels, the first housing element 110 is fixed relative to the work vehicle chassis 22. As such, the first housing element 110, and certain fixed components, may serve as reaction members against which certain forces effected by non-fixed components of the drive assembly 56 are applied. In the example drive assembly 56, the first housing element 110, or a hub portion thereof (e.g., a stationary spindle), forms a reaction member against which reaction forces from the one or more clutch arrangements 400 apply directly. Thus, the first housing element 110, or hub thereof, itself is considered a "reaction member" as used herein for its direct and indirect backstop of applied forces.

The second housing element 112 circumscribes at least a portion the wall portion 118 of the first housing element 110. The second housing element 112 may house portions of the one or more actuation assemblies 300, the one or more clutch arrangements 400 and/or the gear set 600. In one example, the second housing element 112 is coupled to a portion of the gear set 600 to rotate with the gear set 600. In this manner, the second housing element 112 may rotate relative to the first housing element 110. In addition, the second housing element 112 may be considered an annular gear housing.

The third housing element 114 is generally arranged at a second end 104 of the housing arrangement 100 and may function as an end plate for the second housing element 112. The third housing element 114 is rotationally fixed to the second housing element 112 to rotate with the second housing element 112. In one example, the second housing element 112 includes one or more extensions 120 received in corresponding grooves 122 of the third housing element 114 such that rotation of the second housing element 112 effects rotation of the third housing element 114 via interaction between the extensions 120 and grooves 122. In this manner, the third housing element 114 is configured to output torque and rotational speed via the output element 88. In one example, the output element 88 is integrally formed as a unit with the third housing element 114 and may be considered as a hub on the third housing element 114.

In FIG. 4, the second housing element 112 is omitted from the depiction of the example drive assembly 56 for clarity. In addition, the gear set 600 and the third housing element 114 are separated from the first housing element 110 for depiction of internal components of the drive assembly 56. As shown in FIG. 4, the drive shaft 90 extends in the first housing element 110 and an inner hub 200 circumscribes the drive shaft 90. The one or more clutch arrangements 400 are arranged within the first housing element 110 and include a first, or low, clutch arrangement 410 and a second, or high, clutch arrangement 510. It will be appreciated that the one or more clutch arrangements 400 are not limited to the depicted example, and in other embodiments, may include fewer or additional clutch arrangements and/or differently formed clutch arrangements.

Figure 5:
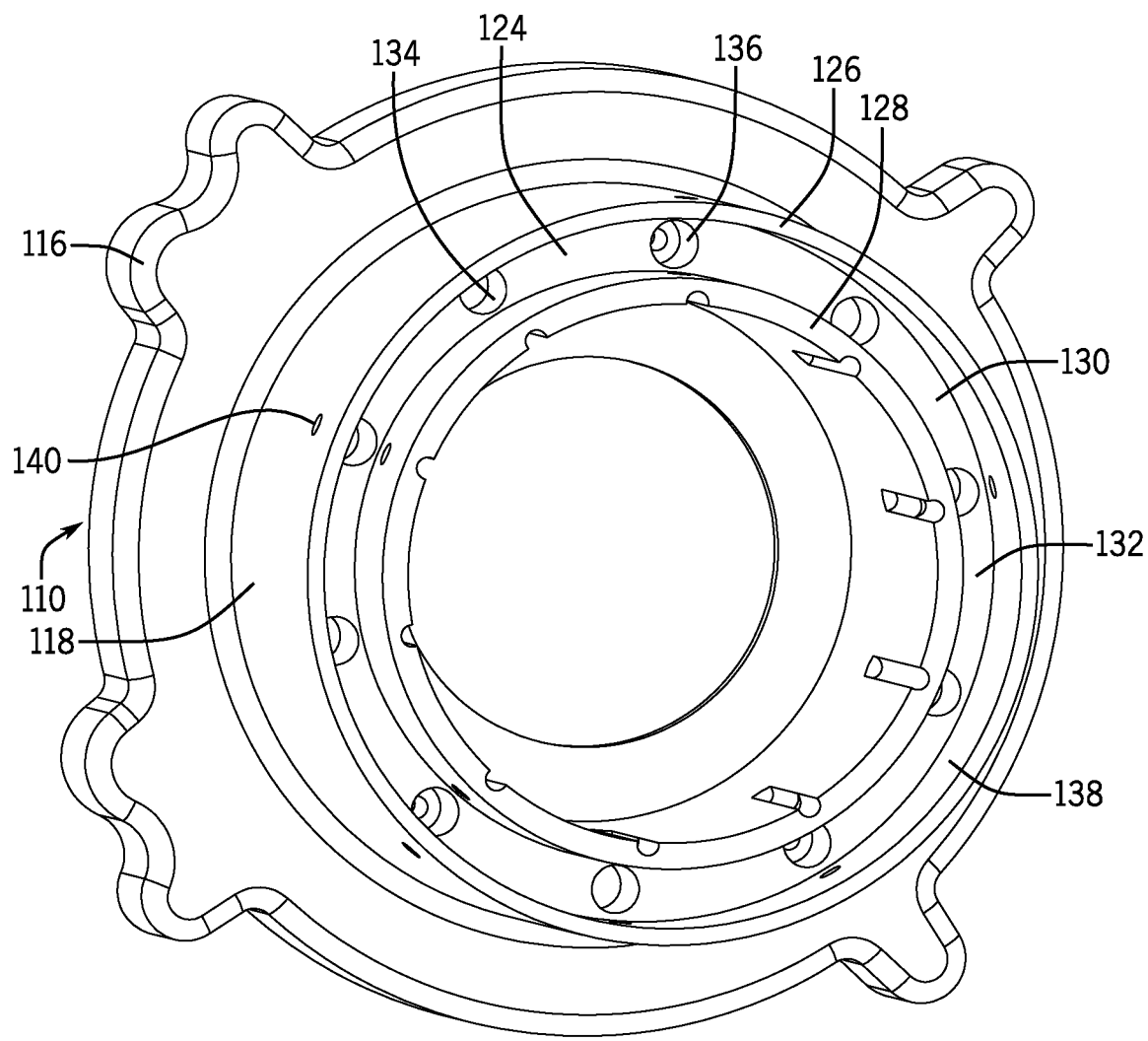
FIG. 5 is an isometric end view of a first housing element of the drive assembly of FIGS. 3 and 4.

As shown in FIG. 5, the wall portion 118 includes a first, or low, chamber 124 formed between a first outer wall 126 and a first inner wall 128. A first base portion 130 extends between the first outer wall 126 and the first inner wall 128 at an inner end 132 of the low chamber 124. A plurality of recesses extend axially into the first base portion 130 in a first axial direction 94. The recesses include one or more first low recesses 134 and/or one or more second low recesses 136. An outer end 138 of the low chamber 124 is open in a direction facing the gear set 600 (i.e., a second axial direction 96).

Figure 6:
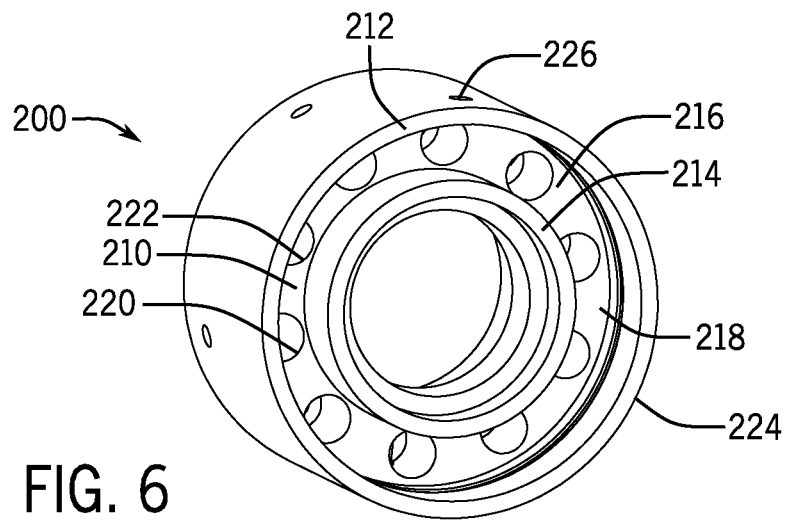
FIG. 6 is an isometric end view of an inner hub of the drive assembly of FIGS. 3 and 4.
Figure 7:
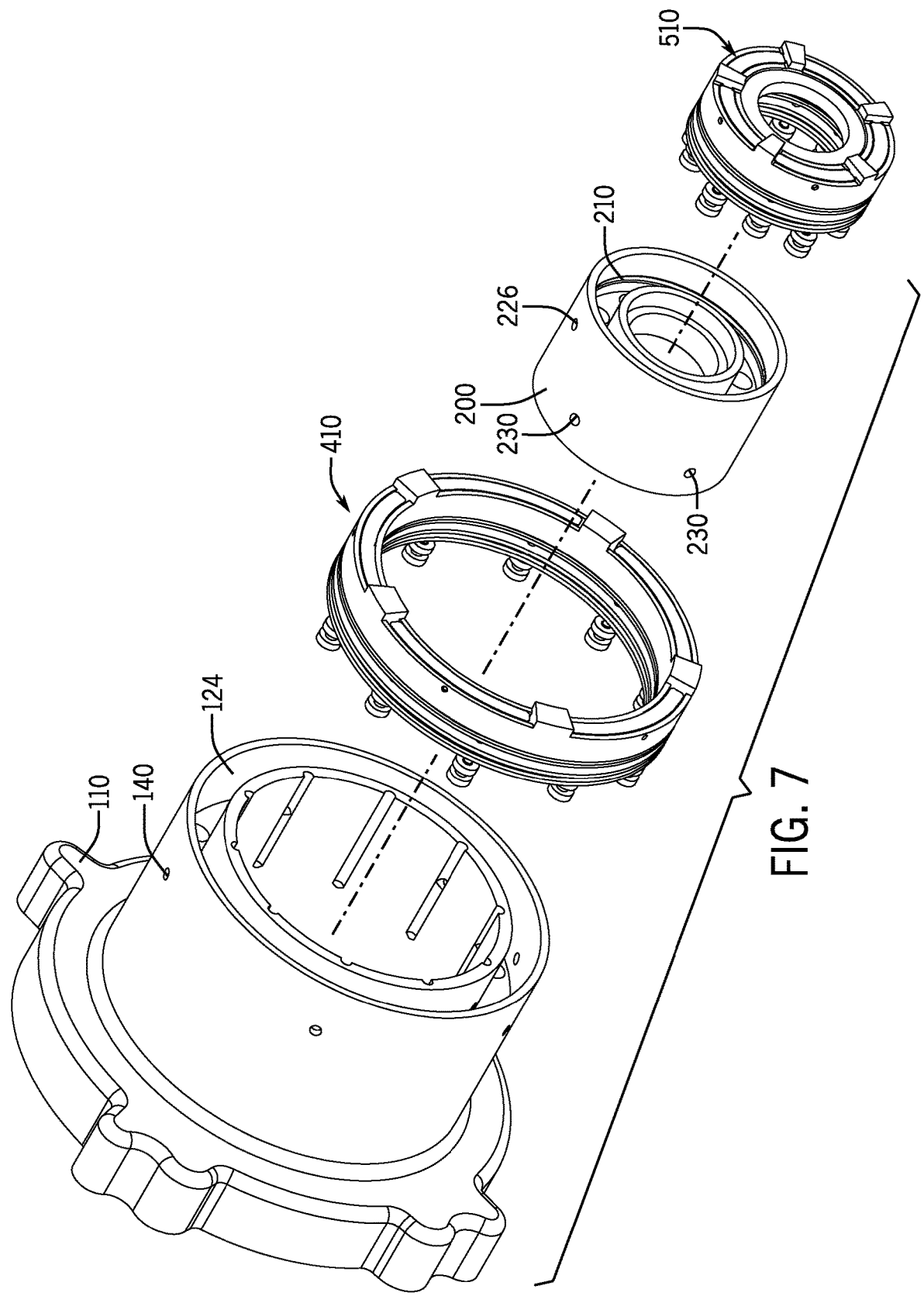
FIG. 7 is an exploded view of a portion of the drive assembly of FIGS. 3 and 4.

Turning now to FIG. 6, the inner hub 200 includes a second, or high, chamber 210 formed between a second outer wall 212 and a second inner wall 214. A second base portion 216 extends between the second outer wall 212 and the second inner wall 214 at an inner end 218 of the high chamber 210. A plurality of recesses extends axially into the second base portion 216 in the first axial direction 94. The recesses include one or more first high recesses 220 and/or one or more second high recesses 222. An outer end 224 of the high chamber 210 is open in a direction facing the gear set 600 (i.e., the second axial direction 96).

With reference to FIGS. 2A and 4-6, in one implementation, the one or more actuation assemblies 300 may be provided as one or more hydraulic actuator assemblies, which may be incorporated as part of the hydraulic system 32 or connected to the hydraulic system 32. The hydraulic system 32 includes various components, for example, one or more pumps, one or more valves, flow lines, pistons/cylinders, seals/gaskets and so on, and is fluidically connected to the drive assembly 56, and/or incorporated, at least in part, within drive assembly 56. Various components of the hydraulic system 32 are controlled by the control system 30 to control hydraulic fluid flow into and/or out of the low chamber 124 and the high chamber 210 to pressurize and/or depressurize the respective chambers 124, 210. The hydraulic system components operable to control hydraulic fluid flow into and/or out of a particular chamber 124, 210 can be considered an actuation assembly for that chamber and corresponding clutch arrangement.

The one or more actuation assemblies may include one or more clutch actuation assemblies. For example, as shown schematically in FIG. 8, components of the hydraulic system 32 operable to control hydraulic fluid flow into and/or out of the low chamber 124 may be considered as a first, or low, clutch actuation assembly 310 or part of a low clutch actuation assembly 310. Similarly, the components of the hydraulic system 32 operable to control hydraulic flow into and/or out of the high chamber 210 may be considered as a second, or high, clutch actuation assembly 320 or part of a high clutch actuation assembly 320. Accordingly, the low clutch actuation assembly 310 is operable to pressurize and/or depressurize the low chamber 124 to effect repositioning of the low clutch arrangement 410, and the high clutch actuation assembly 320 is operable to pressurize and/or depressurize the high chamber 210 to effect repositioning of the high clutch arrangement 510.

In an embodiment, the hydraulic system 32 is hydraulically connected to the low chamber 124 via one or more first chamber passages 140 extending through the first outer wall 126, the first inner wall 128, or both, of the first housing element 110. In this manner, the hydraulic system 32, via the low clutch actuation assembly 310, is configured to provide hydraulic fluid to the low chamber 124 to pressurize the low chamber 124. The low clutch arrangement 410 is repositioned in the second axial direction 96 from the disengaged position to the engaged position relative to the gear set 600 in response to the low chamber 124 being pressurized by the low clutch actuation assembly 310.

The hydraulic system 32 is also hydraulically connected to the high chamber 210 via one or more second chamber passages 226 extending through the second outer wall 212 of the inner hub 200. In this manner, the hydraulic system 32, via the high clutch actuation assembly 320, is configured to provide hydraulic fluid to the high chamber 210 to pressurize the high chamber 210. The high clutch arrangement 510 is repositioned in the second axial direction 96 from the disengaged position to the engaged position relative to the gear set 600 in response to the high chamber 210 being pressurized by the high clutch actuation assembly 320.

The low clutch actuation assembly 310 may also accommodate repositioning of the low clutch arrangement 410 in the first axial direction 94 from the engaged position to the disengaged position relative to the gear set 600. In one example, the low clutch actuation assembly 310 includes a low return spring (not shown) configured to apply a biasing force to the low clutch arrangement 410 in the first axial direction 94. Accordingly, the hydraulic system 32, via the low clutch actuation assembly 310, may depressurize the low chamber 124 to accommodate movement of the low clutch arrangement 410 in the first axial direction 94 under the biasing force of the low return spring.

Similarly, the high clutch actuation assembly 320 may accommodate repositioning of the high clutch arrangement 510 in the first axial direction 94 from the engaged position to the disengaged position relative to the gear set 600. In one example, the high clutch actuation assembly 320 includes a high return spring (not shown) configured to apply a biasing force to the high clutch arrangement 510 in the first axial direction 94. Accordingly, the hydraulic system 32, via the high clutch actuation assembly 320, may depressurize the high chamber 210 to accommodate movement of the high clutch arrangement 510 in the first axial direction 94 under the biasing force of the high return spring.

Figure 8:
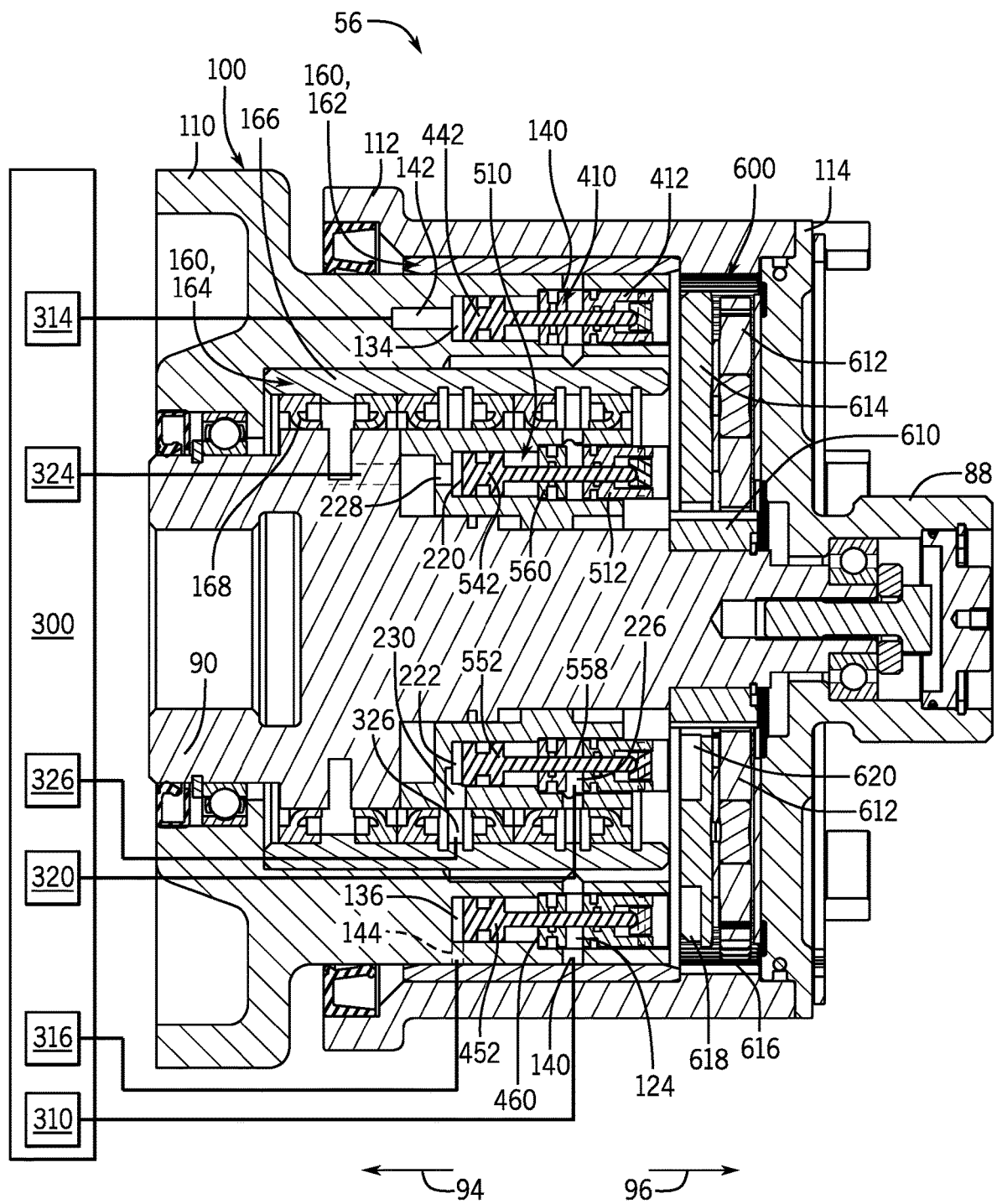
FIG. 8 is a cross-sectional view of the drive assembly of FIGS. 3 and 4.

Referring still to FIG. 8, the housing arrangement 100 further includes a sealing arrangement 160. The sealing arrangement 160 includes an outer sealing arrangement 162 disposed between the wall portion 118 and the second housing element 112. The outer sealing arrangement 162 is configured for sealing hydraulic fluid within the low chamber 124. The sealing arrangement 160 further includes an inner sealing arrangement 164. The inner sealing arrangement 164 is disposed between the wall portion 118 and the inner hub 200 and a portion of the drive shaft 90. The inner sealing arrangement 164 includes an inner seal housing 166 and a plurality of inner seals 168. In one example, the inner seals 168 may include one or more lip seals, each having a sealing lip to bear against an outer surface of the inner hub 200 or the drive shaft 90.

In some examples, the outer sealing arrangement 162 may accommodate one or more of the first chamber passages 140, first low recess passage 142 and second low recess passages 144. The inner sealing arrangement 164 may accommodate one or more of the second chamber passages 226, first high recess passages 228 and second high recess passages 230.

Referring now to FIGS. 9 and 10, the low clutch arrangement 410 generally includes a low clutch ring 412 having a first ring face 414 and a second ring face 416. One or more low clutch engagement elements 418 are arranged on the second ring face 416 and are configured for selective engagement with corresponding portions of the gear set 600. The low clutch engagement elements 418 may be formed as cavities, protrusions, teeth, or dogs, for example, configured for circumferential engagement. In one example the low clutch engagement elements 418 extend outward from the second ring face 416 generally in the second axial direction 96. The low clutch engagement elements 418 each include first and second rotational engagement faces 420, 422 generally facing in the first and second rotational clock directions D1, D2, respectively, and an end engagement face 424 generally facing in the second axial direction 96.

The low clutch ring 412 also includes a low slot arrangement 426 arranged on the second ring face 416. The low slot arrangement 426 is bounded on a radially inner side by an inner low clutch wall 428 and on a radially outer side by an outer low clutch wall 430. In one example, the low slot arrangement 426 includes a plurality of slots and the low clutch engagement elements 418 are interposed between adjacent slots.

The low clutch arrangement 410 further includes a low guide assembly 432 configured to interact with the gear set 600 to effect movement of the low clutch arrangement 410 out of the engaged position relative to the gear set 600. In this manner, operation of the low guide assembly 432 may provide a "kickout" function. The low guide assembly 432 includes one or more movable low guides 434 mounted to the low clutch ring 412. The one or more movable low guides 434 are arranged at least partially in the low slot arrangement 426. In one example, each low guide 434 is arranged in a corresponding slot of the low slot arrangement 426. In the depicted example, the low guide assembly 432 is shown having five movable low guides 434. However, it will be appreciated that the low guide assembly 432 may include greater or fewer low guides 434.

The low clutch ring 412 is arranged in the low chamber 124 and is connected to the wall portion 118 (i.e., one or both of the first outer wall 126 and first inner wall 128) so as to be held against rotation relative to the first housing element 110. That is, the low clutch ring 412 is grounded to the first housing element 110. Accordingly, in the disengaged position of the low clutch ring 412, the gear set 600 may rotate in one or more clock directions relative to the low clutch ring 412. In the engaged position of the low clutch ring 412, a portion of the gear set 600 engaged with the low clutch ring 412 may be held against rotation relative to the low clutch ring 412 in at least one clock direction. That is, the low clutch ring 412 may engage a portion of the gear set 600 to ground that portion of the gear set 600 in at least one clock direction.

In operation, the low clutch actuation assembly 310 pressurizes the low chamber 124 to reposition the low clutch ring 412 in the second axial direction 96 to the engaged position relative to the gear set 600 such that the low clutch engagement elements 418 engage corresponding portions of the gear set 600. The low guide assembly 432 moves together with the low clutch ring 412 in the second axial direction 96. Engagement of the low clutch ring 412 with the planetary gear set 600 grounds the portion of the planetary gear set 600 engaged by the low clutch engagement elements 418 in at least one clock direction.

Each low guide 434 is mounted for selective movement from a retracted position to an extended position relative to the low clutch ring 412 and from the extended position to the retracted position. In the retracted position, the low guides 434 are not configured to interact with the gear set 600. For example, in the retracted position, the low guides 434 may be recessed relative to the low clutch engagements elements 418 and/or positioned substantially within the low slot arrangement 426.

In the extended position, at least a portion of each low guide 434 extends from the low slot arrangement 426 to an axial position at or near an axial position of the end engagement faces 424 of the low clutch engagement elements 418. That is, at least a portion of each low guide 434 is displaced in the second axial direction 96 during movement from the retracted position to the extended position. The low guides 434 are configured to interact with gear set 600 in the extended position to effect movement of the low clutch ring 412 in the first axial direction 94, i.e., to perform a "kickout" operation to disengage the low clutch ring 412 from the gear set 600.

In the depicted example, each low guide 434 is pivotably mounted to the low clutch ring 412 by a corresponding low pivot pin 436. In this manner, each low guide 434 is configured for pivoting movement between the retracted position and the extended position. In one example, each low guide 434 includes a first guide end 438 that is displaced in the second axial direction 96 during pivoting movement from the retracted position to the extended position. Conversely, the first guide end 438 is displaced in the first axial direction 94 during pivoting movement from the extended position to the retracted position.

Each low guide 434 has a low guide engagement surface 440 facing generally in the second axial direction 96. In one example, the low guide engagement surface 440 may be substantially parallel to, or coplanar with, the second ring face 416 of the low clutch ring 412 in the retracted position. In the extended position, the low guide engagement surface 440 is ramped relative to the second ring face 416 and extends substantially to an end engagement face 424 of a corresponding low clutch engagement element 418.

The low guide assembly 432 further includes one or more first low pins 442 configured to interact with corresponding low guides 434 to effect movement of the low guides 434 at least from the retracted position to the extended position. For example, each first low pin 442 may interface with the corresponding low guide 434 at a position between the low pivot pin 436 and the first guide end 438. The first low pins 442 are operated for movement in the second axial direction 96 to effect pivoting movement of corresponding low guides 434 in a first pivot direction P1 to displace the corresponding first guide ends 438 in the second axial direction 96.

In one example, the first low pins 442 are situated in corresponding first low recesses 134 and extend into the low chamber 124 through the first ring face 414 of the low clutch ring 412 and into the low slot arrangement 426 to interface with the corresponding low guide 434. The first low pins 442 are configured for movement together with the low clutch ring 412 with repositioning of the low clutch ring 412 from the disengaged position to the engaged position. The first low pins 442 are also configured for movement relative to low clutch ring 412 to effect movement of the corresponding low guides 434 from the retracted position to the extended position.

Referring to FIGS. 8-10, the one or more actuation assemblies 300 include one or more guide actuation assemblies. The one or more guide actuation assemblies may include a first low guide actuation assembly 314 operable to effect movement of the first low pins 442 relative to the low clutch ring 412 in at least one direction. In one example, the first low guide actuation assembly 314 is configured to effect movement of the first low pins 442 in the second axial direction 96 to move the corresponding low guides 434 from the retracted position to the extended position.

In one example, the first low guide actuation assembly 314 is a hydraulic actuation assembly. To this end, the first low guide actuation assembly 314 may include various components (e.g., pump(s), valve(s), flow lines, and so on) of the hydraulic system 32 that are operable to provide hydraulic fluid to the first low recesses 134 to pressurize the first low recesses 134, and/or remove hydraulic fluid from the first low recesses 134 to depressurize the first low recesses 134. In one example, the first low guide actuation assembly 314 is configured to pressurize the first low recesses 134 to effect movement of corresponding first low pins 442 in the second axial direction 96 and thereby effect movement of the corresponding low guide 434 to the extended position. Conversely, in one example, the first low guide actuation assembly 314 may be configured to depressurize the first low recesses 134 to facilitate movement of corresponding first low pins 442 in the first axial direction 94. The first housing element 110 may include one or more first low recess passages 142 through which hydraulic fluid may be received in and/or removed from corresponding first low recesses 134 by operation of the first low guide actuation assembly 314.

The first low pins 442 may include a first piston portion 444 configured for movement in the corresponding first low recesses 134 and a first rod portion 446 extending from the first piston portion 444. The first rod portion 446 extends through the first ring face 414 of the low clutch ring 412 and into the low slot arrangement 426 to interface with the corresponding low guide 434.

In some examples, the low guides 434 may also be pivoted in a second pivot direction P2 from the retracted position to a second extended position. In the second extended position, a second guide end 450 of corresponding low guides 434, opposite to the first guide end 438, is displaced in the second axial direction 96 with pivoting movement in the second pivot direction P2.

The low guide assembly 432 may further include one or more second low pins 452 configured to interact with corresponding low guides 434 to effect movement of the low guides 434 at least from the retracted position to the second extended position. For example, each second low pin 452 may interface with the corresponding low guide 434 at a position between the low pivot pin 436 and the second guide end 450. The second low pins 452 are operated for movement in the second axial direction 96 to effect pivoting movement of the corresponding low guides 434 in the second pivot direction P2 to displace the corresponding second guide ends 450 in the second axial direction 96.

In one example, the second low pins 452 are situated in corresponding second low recesses 136 and extend into the low chamber 124 through the first ring face 414 of the low clutch ring 412 and into the low slot arrangement 426 to interface with the corresponding low guides 434. The second low pins 452 are configured for movement together with the low clutch ring 412 with repositioning of the low clutch ring 412 from the disengaged position to the engaged position. The second low pins 452 are also configured for movement relative to the low clutch ring 412 to effect movement of the corresponding low guides 434 from the retracted position to the second extended position.

The one or more guide actuation assemblies may further include a second low guide actuation assembly 316 operable to effect movement of the second low pins 452 relative to the low clutch ring 412 in at least one direction. In one example, the second low guide actuation assembly 316 is configured to effect movement of the second low pins 452 in the second axial direction 96 to move the corresponding low guides 434 from the retracted position to the second extended position.

In one example, the second low guide actuation assembly 316 is a hydraulic actuation assembly. To this end, the second low guide actuation assembly 316 may include various components (e.g., pump(s), valve(s), flow lines, and so on) of the hydraulic system 32 that are operable to provide hydraulic fluid to the second low recesses 136 to pressurize the second low recesses 136, and/or remove hydraulic fluid from the second low recesses 136 to depressurize the second low recesses 136. In one example, the second low guide actuation assembly 316 is configured to pressurize the second low recesses 136 to effect movement of corresponding second low pins 452 in the second axial direction 96 and thereby effect movement of the low guide 434 to the second extended position. Conversely, in one example, the second low guide actuation assembly 316 may be configured to depressurize the second low recesses 136 to facilitate movement of the corresponding second low pins 452 in the first axial direction 94. The first housing element 110 may include one or more second low recess passages 144 through which hydraulic fluid may be received in and/or removed from corresponding second low recesses 136 by operation of the second low guide actuation assembly 316.

The second low pins 452 may include a second piston portion 454 configured for movement in the corresponding second low recesses 136 and a second rod portion 456 extending from the second piston portion 454. The second rod portion 456 extends through the first ring face 414 of the low clutch ring 412 and into the low slot arrangement 426 to interface with the corresponding low guide 434.

The low clutch arrangement 410 further includes a low retaining ring 460 arranged in the low chamber 124. In the depicted example, the low retaining ring 460 is arranged at the inner end 132 of the low chamber 124 adjacent to and/or abutting the first base portion 130 of the low chamber 124. The low retaining ring 460 is substantially fixed against movement within the low chamber 124 and may function as a seal between the low chamber 124 and the one or more recesses 134, 136.

To effect disengagement of the low clutch arrangement 410 from the gear set 600, the first low recesses 134 are pressurized by the first low guide actuation assembly 314 to move the corresponding first low pins 442 in the second axial direction 96. Accordingly, respective low guides 434 are pivoted in the first pivot direction P1 to move the low guides 434 to the first extended position. Rotation of the gear set 600 relative to the low clutch arrangement 410 causes a portion of the gear set 600 to interact with the low guide engagement surface 440 so as to slide along the ramped surface. Such movement causes the low clutch ring 412 to move in the first axial direction 94 to disengage from the gear set 600 in a "kickout" operation.

Alternatively, the second low recesses 136 are pressurized by the second low guide actuation assembly 316 to move the corresponding second low pins 452 in the second axial direction 96. Accordingly, respective low guides 434 are pivoted in the second pivot direction P2 to move the low guides 434 to the second extended position. Rotation of the gear set 600 relative to the low clutch arrangement 410, via interaction between a portion of the gear set 600 and the ramped surface, causes the low clutch ring 412 to move in the first axial direction 94 to disengage from the gear set 600 in a "kickout" operation.

The first and second piston portions 444, 454 are moved in the first axial direction 94 in the corresponding first and second low recesses 134, 136 with movement of the low clutch ring 412 in the first axial direction 94. The first low recesses 134, or alternatively, the second low recesses 136 may be depressurized by the corresponding first or second low guide actuation assembly 314, 316 to accommodate movement in the first axial direction 94.

In one example, the low guide 434 may be moved from the first extended position to the retracted position by depressurizing the first low recess 134 and pressurizing the second low recess 136 to advance the second low pin 452 in the second axial direction 96, thereby pivoting the low guide 434 in the second pivot direction P2 to return to the retracted position. The first low pin 442 may be moved in the first axial direction 94 within the depressurized first low recess 134 with movement of the low guide 434 in the second pivot direction P2.

Similarly, the low guide 434 may be moved from the second extended position to the retracted position by depressurizing the second low recess 136 and pressurizing the first low recess 134 to advance the first low pin 442 in the second axial direction 96, thereby pivoting the low guide 434 in the first pivot direction P1 to return to the retracted position. The second low pin 452 may be moved in the first axial direction 94 within the depressurized second low recess 136 with movement of the low guide 434 in the first pivot direction P1.

Alternatively, in either the first or second extended positions, the low guide 434 may be returned to the retracted position by interaction with the gear set 600 with first and second low recesses 134, 136 depressurized and the low clutch arrangement 410 moved to the engaged position relative to the gear set 600.

Referring now to FIGS. 11 and 12, the high clutch arrangement 510 generally includes a high clutch ring 512 having a first ring face 514 and a second ring face 516. One or more high clutch engagement elements 518 are arranged on the second ring face 516 and are configured for selective engagement with corresponding portions of the gear set 600. The high clutch engagement elements 518 may be formed as cavities, protrusions, teeth, or dogs, for example, configured for circumferential engagement. In one example the high clutch engagement elements 518 extend outward from the second ring face 516 generally in the second axial direction 96. The high clutch engagement elements 518 each include first and second rotational engagement faces 520, 522 generally facing in the first and second rotational clock directions D1, D2, respectively, and an end engagement face 524 generally facing in the second axial direction 96.

The high clutch ring 512 also includes a high slot arrangement 526 arranged on the second ring face 516. The high slot arrangement 526 is bounded on a radially inner side by an inner high clutch wall 528 and on a radially outer side by an outer high clutch wall 530. In one example, the high slot arrangement 526 includes a plurality of slots and the high clutch engagement elements 518 are interposed between adjacent slots.

The high clutch arrangement 510 further includes a high guide assembly 532 configured to interact with the gear set 600 to effect movement of the high clutch arrangement 510 out of the engaged position relative to the gear set 600. In this manner, operation of the high guide assembly 532 may provide a "kickout" function. The high guide assembly 532 includes one or more movable high guides 534 mounted to the high clutch ring 512. The one or more movable high guides 534 are arranged at least partially in the high slot arrangement 526. In one example, each high guide 534 is arranged in a corresponding slot of the high slot arrangement 526. In the depicted example, the high guide assembly 532 is shown having five movable high guides 534. However, it will be appreciated that the high guide assembly 532 may include greater or fewer high guides 534.

The high clutch ring 512 is arranged in the high chamber 210 and is connected to the one or both of the second outer wall 212 and the second inner wall 214 to rotate together with the inner hub 200. That is, the high clutch ring 512 is rotationally fixed to the inner hub 200. Accordingly, in the disengaged position of the high clutch ring 512, the high clutch ring 512 may rotate relative to at least a portion of the gear set 600. In the engaged position of the high clutch ring 512, the high clutch ring 512 drives rotation of the portion of gear set 600 engaged by the high clutch ring 512. That is, the high clutch ring 512 may engage a portion of the gear set 600 to drive rotation of that portion of the gear set 600.

In operation, the high clutch actuation assembly 320 pressurizes the high chamber 210 to reposition the high clutch ring 512 in the second axial direction 96 to the engaged position relative to the gear set 600 such that the high clutch engagement elements 518 engage corresponding portions of the gear set 600. The high guide assembly 532 moves together with the high clutch ring 512 in the second axial direction 96. Engagement of the high clutch ring 512 with the planetary gear set 600 locks the drive shaft 90 to the planetary gear set 600 via the high clutch ring 512.

Each high guide 534 is mounted for selective movement from a retracted position to an extended position relative to the high clutch ring 512 and from the extended position to the retracted position. In the retracted position, the high guides 534 are not configured to interact with the gear set 600. For example, in the retracted position, the high guides may be recessed relative to the high clutch engagement elements 518 and/or positioned substantially within the high slot arrangement 526.

In the extended position, at least a portion of each high guide 534 extends from the high slot arrangement 526 to an axial position at or near an axial position of the end engagement faces 524 of the high clutch engagement elements 518. That is, at least a portion of each high guide 534 is displaced in the second axial direction 96 during movement from the retracted position to the extended position. The high guides 534 are configured to interact with gear set 600 in the extended position to effect movement of the high clutch ring 512 in the first axial direction 94, i.e., to perform a "kickout" operation to disengage the high clutch ring 512 from the gear set 600.

In the depicted example, each high guide 534 is pivotably mounted to the high clutch ring 512 by a corresponding high pivot pin 536. In this manner, each high guide 534 is configured for pivoting movement between the retracted position and the extended position. In one example, each high guide 534 includes a first guide end 538 that is displaced in the second axial direction 96 during pivoting movement from the retracted position to the extended position. Conversely, the first guide end 538 is displaced in the first axial direction 94 during pivoting movement from the extended position to the retracted position.

Each high guide 534 has a high guide engagement surface 540 facing generally in the second axial direction 96. In one example, the high guide engagement surface 540 may be substantially parallel to, or coplanar with, the second ring face 516 of the high clutch ring 512 in the retracted position. In the extended position, the high guide engagement surface 540 is ramped relative to the second ring face 516 and extends substantially to an end engagement face 524 of a corresponding high clutch engagement element 518.

The high guide assembly 532 further includes one or more first high pins 542 configured to interact with corresponding high guides 534 to effect movement of the corresponding high guides 534 at least from the retracted position to the extended position. For example, each first high pin 542 may interface with the corresponding high guide 534 at a position between the high pivot pin 536 and the first guide end 538. The first high pins 542 are operated for movement in the second axial direction 96 to effect pivoting movement of the corresponding high guides 534 in a first pivot direction P1 from the retracted position to the extended position such that the corresponding first guide ends 538 are displaced in the second axial direction 96.

In one example, the first high pins 542 are situated in corresponding first high recesses 220 and extend into the high chamber 210 through the first ring face 514 of the high clutch ring 512 and into the high slot arrangement 526 to interface with the corresponding high guide 534. The first high pins 542 are configured for movement together with the high clutch ring 512 with repositioning of the high clutch ring 512 from the disengaged position to the engaged position. The first high pins 542 are also configured for movement relative to high clutch ring 512 to effect movement of the corresponding high guides 534 from the retracted position to the extended position.

Referring to FIGS. 8, 11 and 12, the one or more guide actuation assemblies may include a first high guide actuation assembly 324 operable to effect movement of the first high pins 542 relative to the high clutch ring 512 in at least one direction. In one example, the first high guide actuation assembly 324 is configured to effect movement of the first high pins 542 in the second axial direction 96 to move the high guide 534 from the retracted position to the extended position.

In one example, the first high guide actuation assembly 324 is a hydraulic actuation assembly. To this end, the first high guide actuation assembly 324 may include various components (e.g., pump(s), valve(s), flow lines, and so on) of the hydraulic system 32 that are operable to provide hydraulic fluid to the first high recesses 220 to pressurize the first high recesses 220, and/or remove hydraulic fluid from the first high recesses 220 to depressurize the first high recesses 220. In one example, the first high guide actuation assembly 324 is configured to pressurize the first high recesses 220 to effect movement of corresponding first high pins 542 in the second axial direction 96 and thereby effect movement of the high guide 534 to the extended position. Conversely, in one example, the first high guide actuation assembly 324 may be configured to depressurize the first high recesses 220 to facilitate movement of corresponding first high pins 542 in the first axial direction 94. The inner hub 200 may include one or more first high recess passages 228 through which hydraulic fluid may be received in and/or removed from corresponding first high recesses 220 by operation of the first high guide actuation assembly 324.

The first high pins 542 may include a first piston portion 544 configured for movement in the corresponding first high recesses 220 and a first rod portion 546 extending from the first piston portion 544. The first rod portion 546 extends through the first ring face 514 of the high clutch ring 512 and into the high slot arrangement 526 to interface with the corresponding high guide 534.

In some examples, the high guides 534 may also be pivoted in a second pivot direction P2 from the retracted position to a second extended position. In the second extended position, a second guide end 550 of corresponding high guides 534, opposite to the first guide end 538, is displaced in the second axial direction 96 with pivoting movement in the second pivot direction P2.

The high guide assembly 532 may further include one or more second high pins 552 configured to interact with corresponding high guides 534 to effect movement of the high guides 534 at least from the retracted position to the second extended position. For example, each second high pin 552 may interface with the corresponding high guide 534 at a position between the high pivot pin 536 and the second guide end 550. The second high pins 552 are operated for movement in the second axial direction 96 to effect pivoting movement of the corresponding high guides 534 in the second pivot direction P2 to displace the corresponding second guide ends 550 in the second axial direction 96.

In one example, the second high pins 552 are situated in corresponding second high recesses 222 and extend into the high chamber 210 through the first ring face 514 of the high clutch ring 512 and into the high slot arrangement 526 to interface with the corresponding high guide 534. The second high pins 552 are configured for movement together with the high clutch ring 512 with repositioning of the high clutch ring 512 from the disengaged position to the engaged position. The second high pins 552 are also configured for movement relative to the high clutch ring 512 to effect movement of the corresponding high guides 534 from the retracted position to the second extended position.

The one or more guide actuation assemblies may further include a second high guide actuation assembly 326 operable to effect movement of the second high pins 552 relative to the high clutch ring 512 in at least one direction. In one example, the second high guide actuation assembly 326 is configured to effect movement of the second high pins 552 in the second axial direction 96 to move the corresponding high guides 534 from the retracted position to the second extended position.

In one example, the second high guide actuation assembly 326 is a hydraulic actuation assembly. To this end, the second high guide actuation assembly 326 may include various components (e.g., pump(s), valve(s), flow lines, and so on) of the hydraulic system 32 that are operable to provide hydraulic fluid to the second high recesses 222 to pressurize the second high recesses 222, and/or remove hydraulic fluid from the second high recesses 222 to depressurize the second high recesses 222. In one example, the second high guide actuation assembly 326 is configured to pressurize the second high recesses 222 to effect movement of corresponding second high pins 552 in the second axial direction 96 and thereby effect movement of the high guide 534 to the second extended position. Conversely, in one example, the second high guide actuation assembly 326 may be configured to depressurize the second high recesses 222 to facilitate movement of the corresponding second high pins 552 in the first axial direction 94. The inner hub 200 may include one or more second high recess passages 230 through which hydraulic fluid may be received in and/or removed from corresponding second high recesses 222 by operation of the second high guide actuation assembly 326.

The second high pins 552 may include a second piston portion 554 configured for movement in the corresponding second high recesses 222 and a second rod portion 556 extending from the second piston portion 554. The second rod portion 556 extends through the first ring face 514 of the high clutch ring 512 and into the high slot arrangement 526 to interface with the corresponding high guide 534.

The high clutch arrangement 510 further includes a high retaining ring 560 arranged in the high chamber 210. In the depicted example, the high retaining ring 560 is arranged at the inner end 218 of the high chamber 210 adjacent to and/or abutting the base portion 216 of the high chamber 210. The high retaining ring 560 is substantially fixed against movement within the high chamber 210 and may function as a seal between the high chamber 210 and the one or more high recesses 220, 222.

To effect disengagement of the high clutch arrangement 510 from the gear set 600, the first high recesses 220 are pressurized by the first high guide actuation assembly 324 to move the corresponding first high pins 542 in the second axial direction 96. Accordingly, respective high guides 534 are pivoted in the first pivot direction P1 to move the high guides 534 to the first extended position. Rotation of the gear set 600 relative to the high clutch arrangement 510 in a first clock direction D1 causes the gear set 600 to interact with the high guide engagement surface 540 so as to slide along the ramped surface. Such movement causes the high clutch ring 512 to move in the first axial direction 94 to disengage from the gear set 600 in a "kickout" operation.

Alternatively, the second high recesses 222 are pressurized by the second high guide actuation assembly 326 to move the corresponding second high pins 552 in the second axial direction 96. Accordingly, respective high guides 534 are pivoted in the second pivot direction P2 to move the high guides 534 to the second extended position. Rotation of the gear set 600 relative to the high clutch arrangement 510, or vice versa, in a second clock direction D2 causes the gear set 600 to apply a force against the high clutch ring 512 (via the high guide 534) to effect movement of the high clutch ring 512 in the first axial direction 94 out of the engaged position in a "kickout" operation.

The first and second piston portions 544, 554 are moved in the first axial direction 94 in the corresponding first and second high recesses 220, 222 with movement of the high clutch ring 512 in the first axial direction 94. The first high recesses 220, or alternatively, the second high recesses 222 may be depressurized by the corresponding first or second high guide actuation assembly 324, 326 to accommodate movement in the first axial direction 94.

In one example, the high guide 534 may be moved from the first extended position to the retracted position by depressurizing the first high recess 220 and pressurizing the second high recess 222 to advance the second high pin 552 in the second axial direction 96, thereby pivoting the high guide 534 in the second pivot direction P2 to return to the retracted position. The first high pin 542 may be moved in the first axial direction 94 within the depressurized first high recess 220 with movement of the high guide 534 in the second pivot direction P2.

Similarly, the high guide 534 may be moved from the second extended position to the retracted position by depressurizing the second high recess 222 and pressurizing the first high recess 220 to advance the first high pin 542 in the second axial direction 96, thereby pivoting the high guide 534 in the first pivot direction P1 to return to the retracted position. The second high pin 552 may be moved in the first axial direction 94 within the depressurized second high recess 222 with movement of the high guide 534 in the first pivot direction P1.

Alternatively, in either the first or second extended positions, the high guide 534 may be returned to the retracted position by interaction with the gear set 600 with first and second high recesses 220, 222 depressurized and the high clutch arrangement 510 moved to the engaged position.

Referring again to FIG. 8, the gear set 600 is a planetary gear set. In some embodiments, the drive shaft 90 may be considered part of the planetary gear set 600. Although one example configuration of the planetary gear set 600 is described below, other embodiments may have different configurations.

The planetary gear set 600 includes a sun gear 610 mounted for rotation with the drive shaft 90. The sun gear 610 includes a plurality of teeth or splines that mesh with a set of planet gears 612 that circumscribe the sun gear 610. In one example, the planet gears 612 include a single circumferential row of one or more planet gears, although other embodiments may include radially stacked rows.

The planet gears 612 are supported by a planet carrier 614, which circumscribes the sun gear 610, as well as the drive shaft 90, and is at least partially formed by first and second radially extending, axially facing carrier plates. The carrier plates of the planet carrier 614 include a row of mounting locations for receiving axles extending through and supporting the planet gears 612 for rotation. As such, in this arrangement, each of the planet axles respectively forms an individual axis of rotation for each of the planet gears 612, and the planet carrier 614 enables the set of planet gears 612 to collectively rotate about the sun gear 610.

The gear set 600 further includes a ring gear 616 that circumscribes the sun gear 610 and the planet gears 612. The ring gear 616 includes radially interior teeth that engage the teeth of the planet gears 612. As such, planet gears 612 extend between, and engage with, the sun gear 610 and the ring gear 616.

The ring gear 616 is fixedly arranged within the interior of the rotatable second housing element 112, which functions as a gear housing. The third housing element 114 rotates together with the ring gear 616 and forms part of the output element 88 such that the ring gear 616, the second housing element 112, the third housing element 114 and the output element 88 rotate as a unit. With respect to the planetary gear set 600, the rotatable second and third housing elements 112, 114 and/or ring gear 616 may function as the output element 88 in one or more rotational or clock directions.

Figure 13:
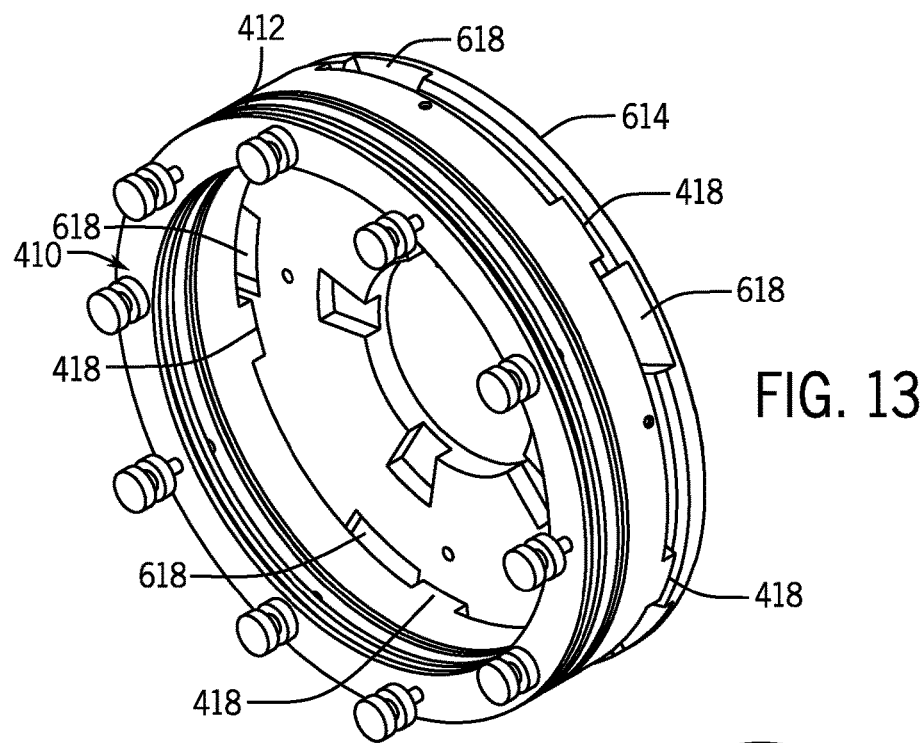
FIG. 13 is an isometric view of the low clutch arrangement and a portion of a gear set of the drive assembly of FIGS. 3 and 4.
Figure 14:
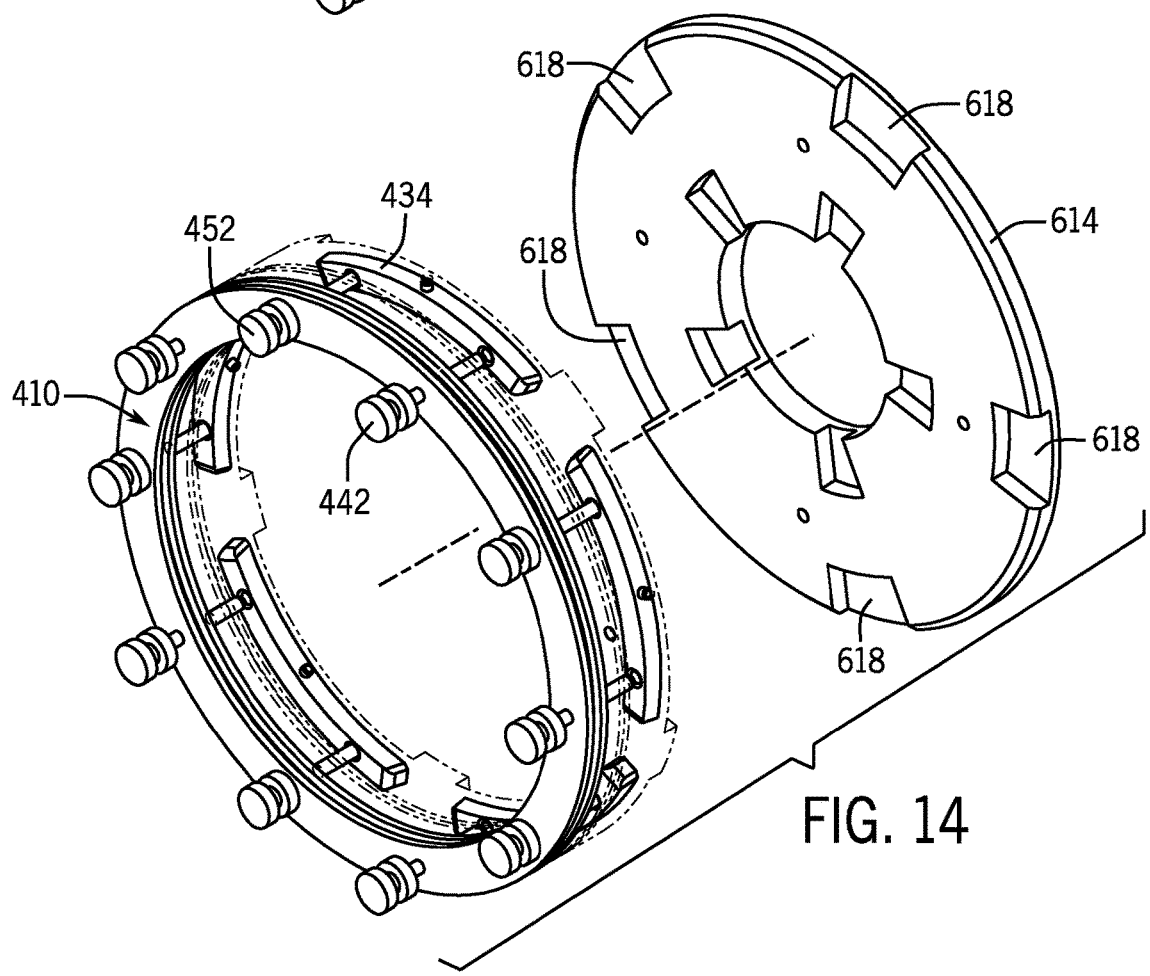
FIG. 14 is an exploded view of the low clutch arrangement and portion of the gear set of FIG. 13.

As shown in FIGS. 13 and 14, the planet carrier 614 includes one or more low carrier engagement elements 618 configured for selective engagement with corresponding one or more low clutch engagement elements 418. The one or more low carrier engagement elements 618 may be formed as recesses, pockets, slots, dogs, and the like. In the depicted example, the low carrier engagement elements are formed as recesses in an axial face of the planet carrier 614. The low carrier engagement elements 618 are configured to receive the corresponding low clutch engagement elements 418 with the low clutch arrangement 410 in the engaged position relative to the gear set 600. Conversely, the low carrier engagement elements 618 are axially spaced from the low clutch engagement elements 418 with the low clutch arrangement 410 in the disengaged position relative to the gear set 600. The low carrier engagement elements 618 may have a dimension in the circumferential direction of the planet carrier 614 that is greater than a dimension in the circumferential direction of the low clutch ring 412 of corresponding low clutch engagement elements 418.

In some examples, the first and second rotational engagement faces 420, 422 of the low clutch engagement elements 418 and corresponding portions of the low carrier engagement elements 618 may be formed having a complementary rear taper. In this manner, with the low clutch engagement elements 418 engaged with corresponding low carrier engagement elements 618, and one of the first or second rotational engagement face 420, 422 engaged with a corresponding face of the low carrier engagement elements 618, the complementary rear taper may resist movement of the low clutch engagement elements 418 relative to the low carrier engagement elements 618 in the first axial direction 94. That is, the complementary rear taper of the low clutch engagement elements 418 and corresponding low carrier engagement elements 618 resists disengagement of the low clutch ring 412 from the planet carrier 614.

Further, in some examples, the low clutch engagement elements 418 and/or the low carrier engagement elements 618 may be coated or treated with a friction material. Accordingly, increased friction may be provided between corresponding faces of the low clutch engagement elements 418 and the low carrier engagement elements 618 to further resist disengagement of the low clutch ring 412 from the planet carrier 614.

The low clutch arrangement 410 is rotationally fixed to the first housing element 110 and thus, is held rotationally stationary. Accordingly, in the engaged position, the low clutch arrangement 410 fixes the planet carrier 614 against rotation in at least one clock direction by interaction between the low clutch engagement elements 418 and the low carrier engagement elements 618. It will be appreciated, that while the low clutch arrangement 410 holds the planet carrier 614 against rotation, some relative rotation may occur during engagement and disengagement movements of the low clutch arrangement 410 according to rotational clearances between the corresponding engagement elements 418, 618 of the low clutch arrangement 410 and the planet carrier 614.

Figure 16:
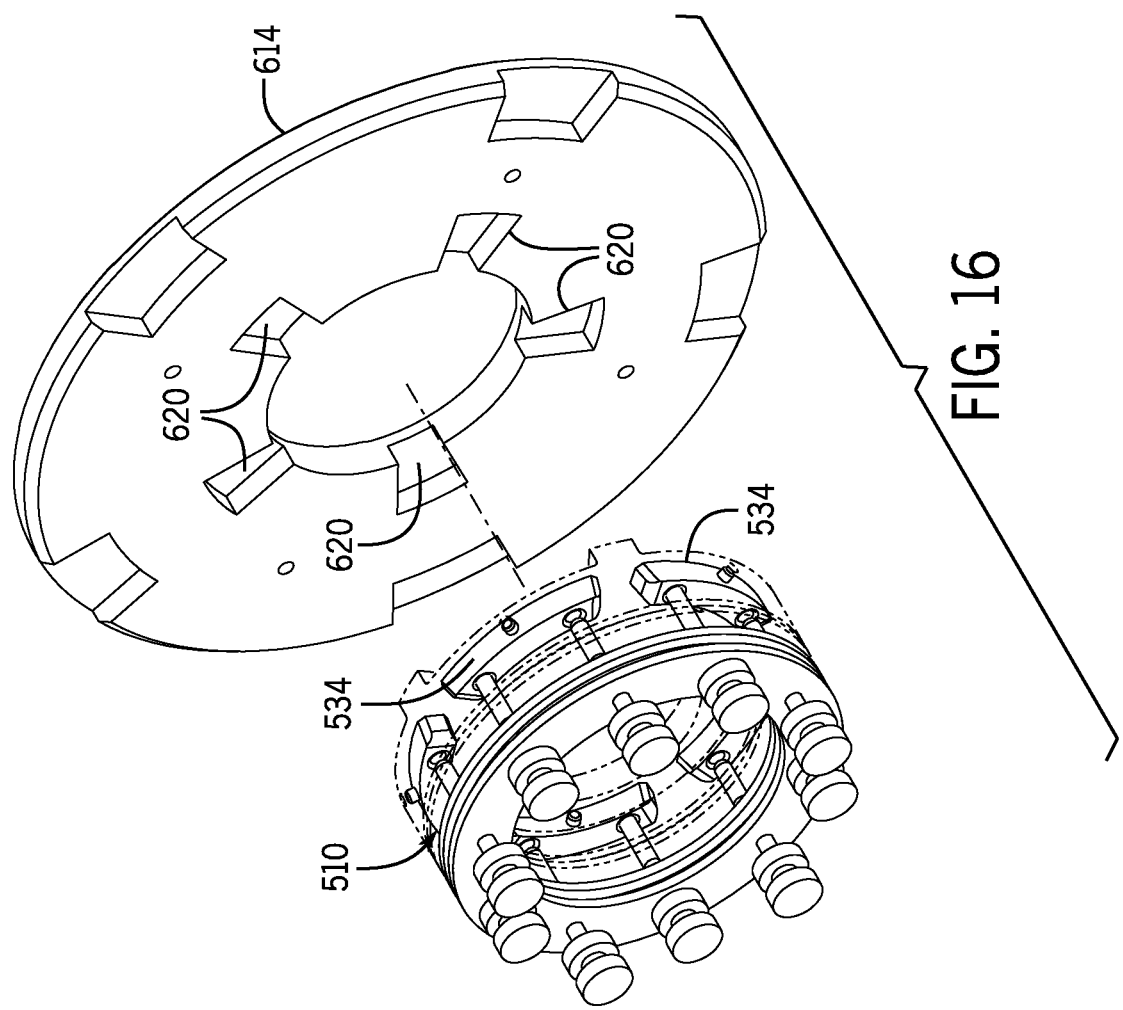
FIG. 16 is an exploded view of the high clutch arrangement and the portion of the gear set of FIG. 15.
Figure 15:
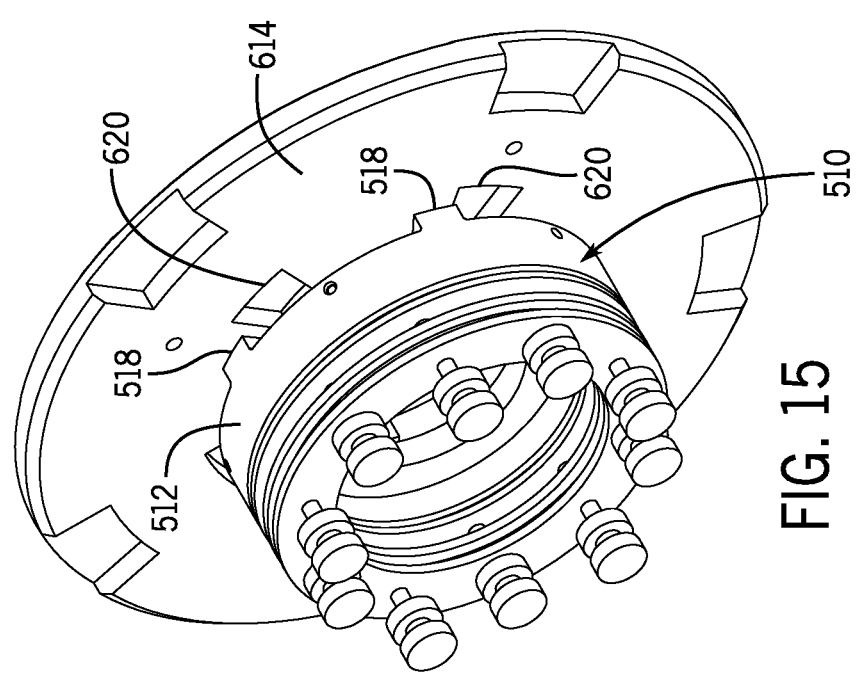
FIG. 15 is an isometric view of the high clutch arrangement and a portion of the gear set of the drive assembly of FIGS. 3 and 4.

Referring now to FIGS. 15 and 16, the planet carrier 614 also includes one or more high carrier engagement elements 620 configured for selective engagement with corresponding one or more high clutch engagement elements 518. The one or more high carrier engagement elements 620 may be formed as recesses, pockets, slots, dogs, and the like. In the depicted example, the high carrier engagement elements 620 are formed as recesses in an axial face of the planet carrier 614. The high carrier engagement elements 620 are configured to receive the corresponding high clutch engagement elements 518 with the high clutch arrangement 510 in the engaged position relative to the gear set 600. Conversely, the high carrier engagement elements 620 are axially spaced from the high clutch engagement elements 518 with the high clutch arrangement 510 in the disengaged position relative to the gear set 600. The high carrier engagement elements 620 may have a dimension in the circumferential direction of the planet carrier 614 that is greater than a dimension in the circumferential direction of the high clutch ring 512 of corresponding low clutch engagement elements 518.

In some examples, the first and second rotational engagement faces 520, 522 of the high clutch engagement elements 518 and corresponding portions high carrier engagement elements 620 may be formed having a complementary rear taper. In this manner, with the high clutch engagement elements 518 engaged with corresponding high carrier engagement elements 620, and one of the first or second rotational engagement face 520, 522 engaged with a corresponding face of the high carrier engagement elements 620, the complementary rear taper may resist movement of the high clutch engagement elements 518 relative to the high carrier engagement elements 620 in the first axial direction 94. That is, the complementary rear taper of the high clutch engagement elements 518 and corresponding high carrier engagement elements 620 resists disengagement of the high clutch ring 512 from the planet carrier 614.

Further, in some examples, the high clutch engagement elements 518 and/or the high carrier engagement elements 620 may coated or treated with a friction material. Accordingly, increased friction may be provided between corresponding faces of the high clutch engagement elements 518 and the high carrier engagement elements 620 to further resist disengagement of the high clutch ring 512 from the planet carrier 614.

The high clutch arrangement 510 is rotationally fixed to the inner hub 200, which is rotationally fixed to the drive shaft 90. Thus, the high clutch arrangement 510 rotates together with the drive shaft 90. Accordingly, in the engaged position, the high clutch arrangement 510 drives the planet carrier 614 in the first clock direction D1 or second clock direction D2 by interaction between the high clutch engagement elements 518 and the high carrier engagement elements 620.

Figure 17A:
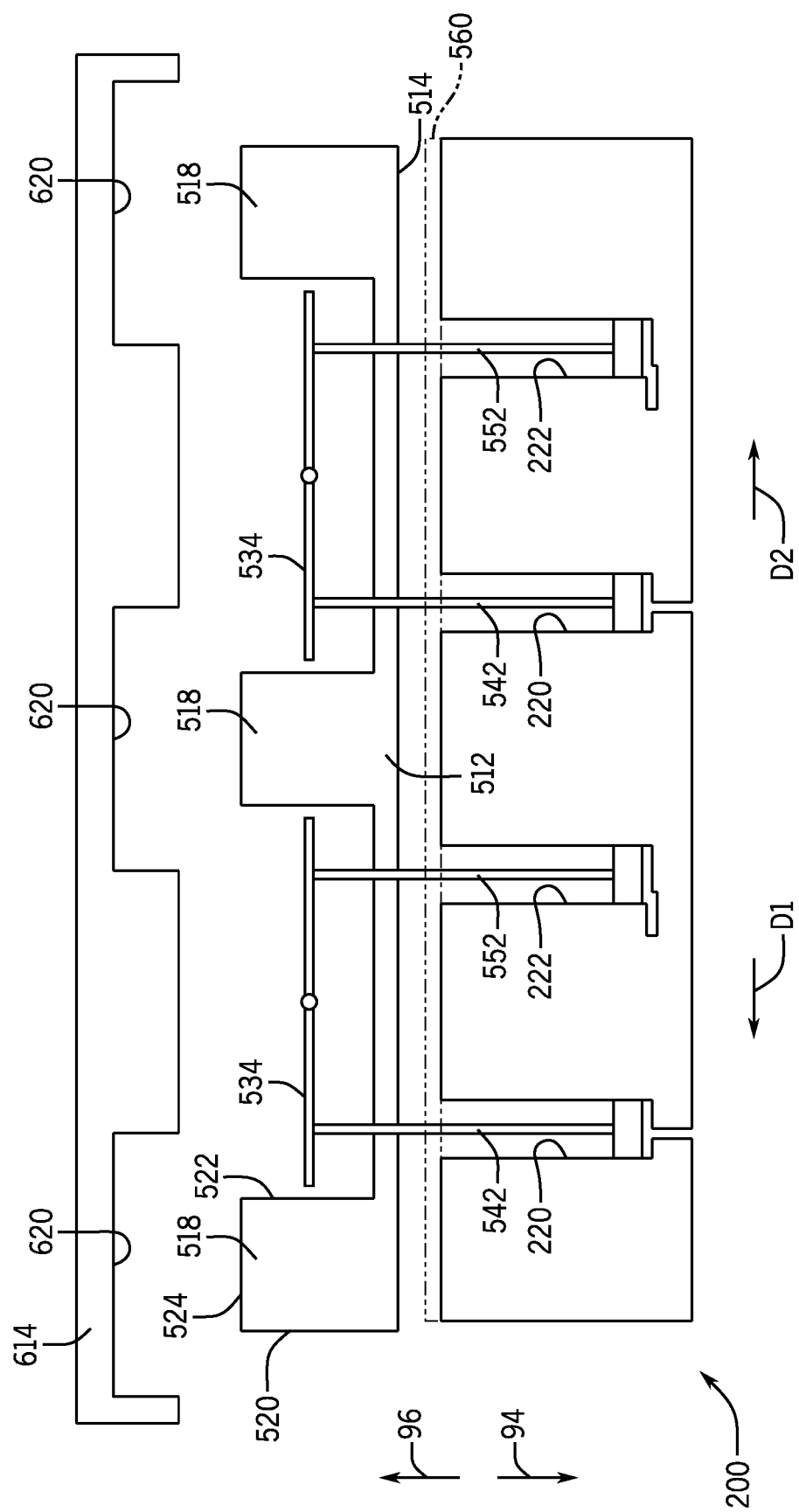
Figure 17B:
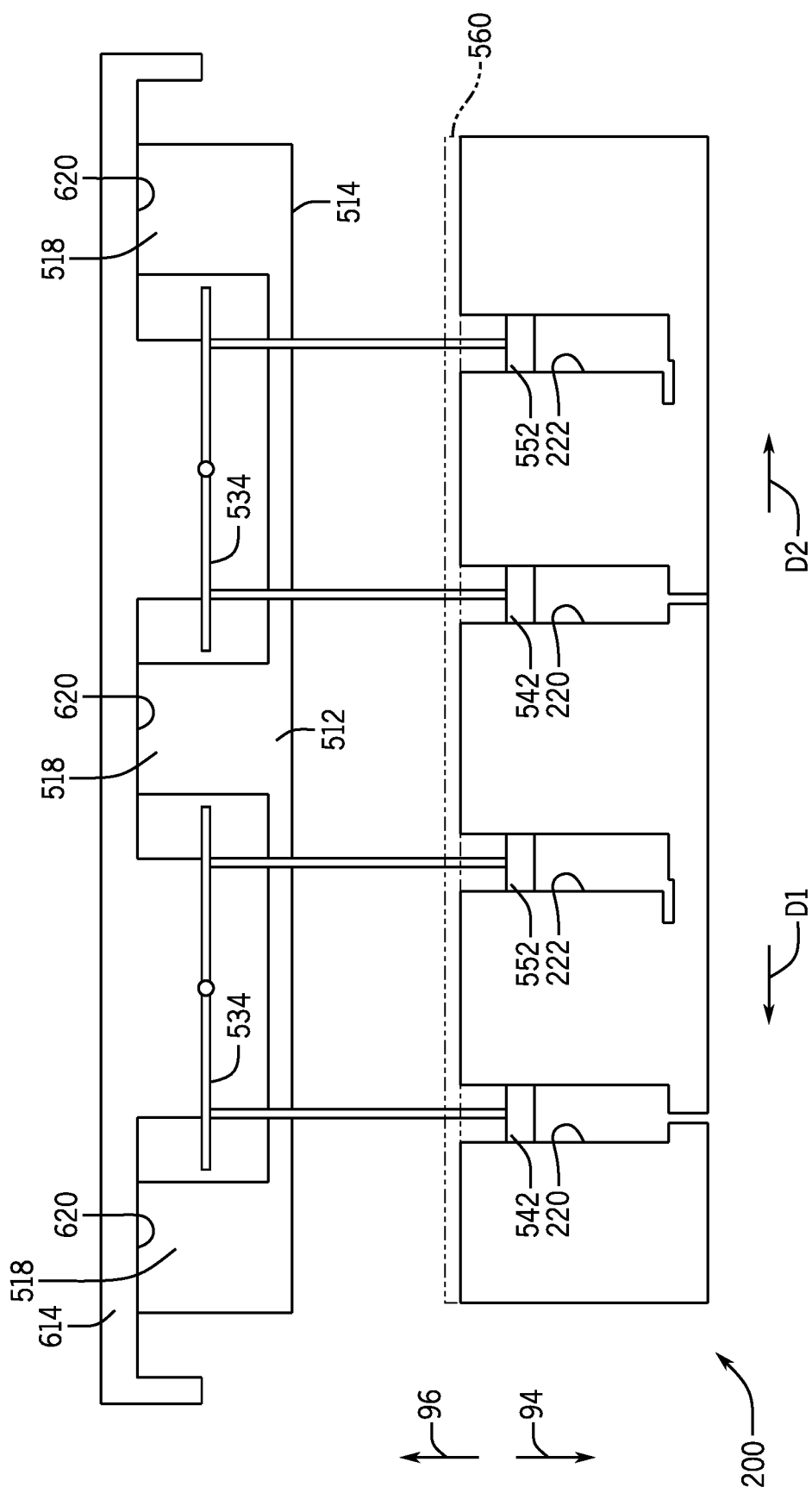
Figure 17C:
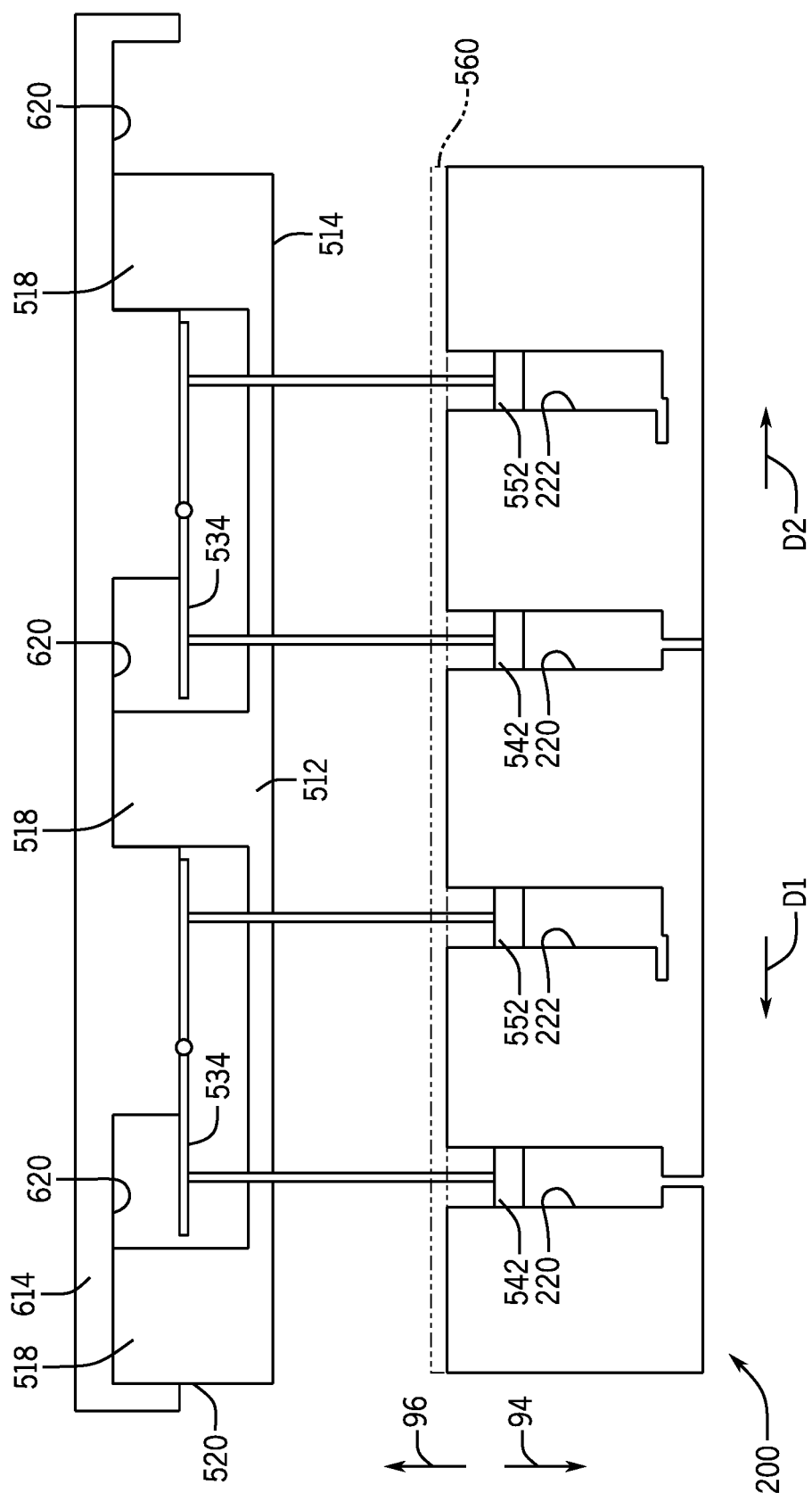
Figure 17D:
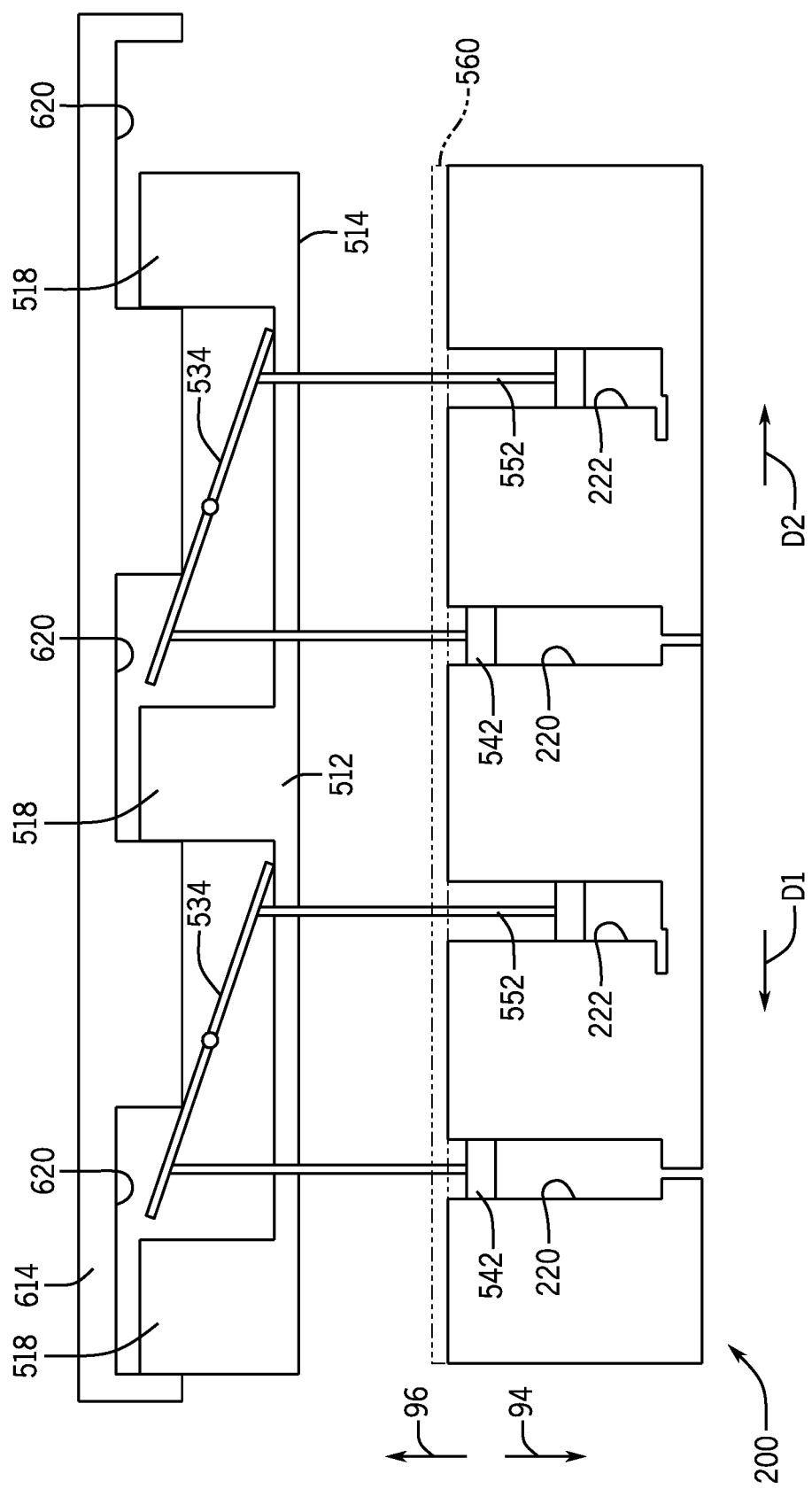
Figure 17F:
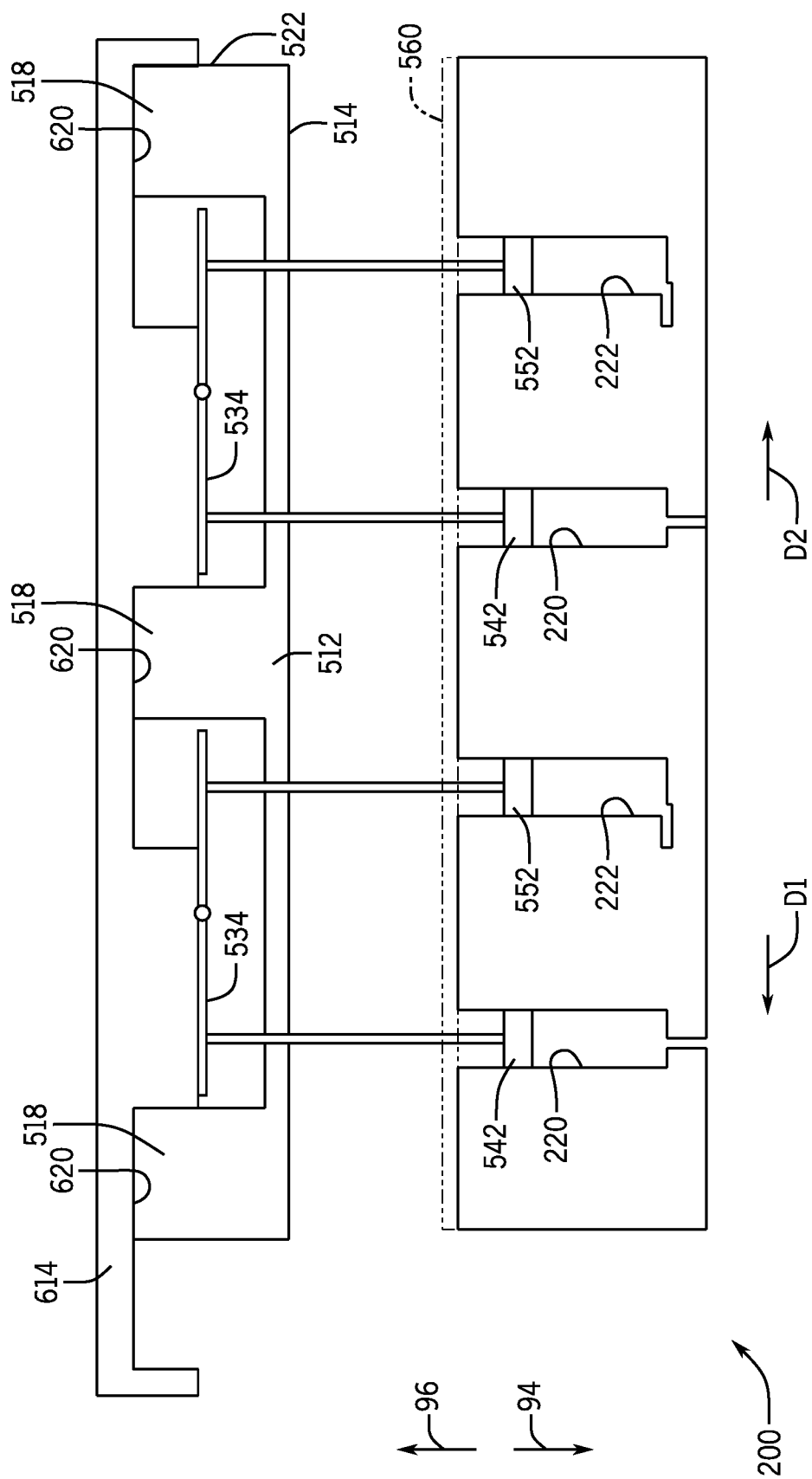
Figure 17G:
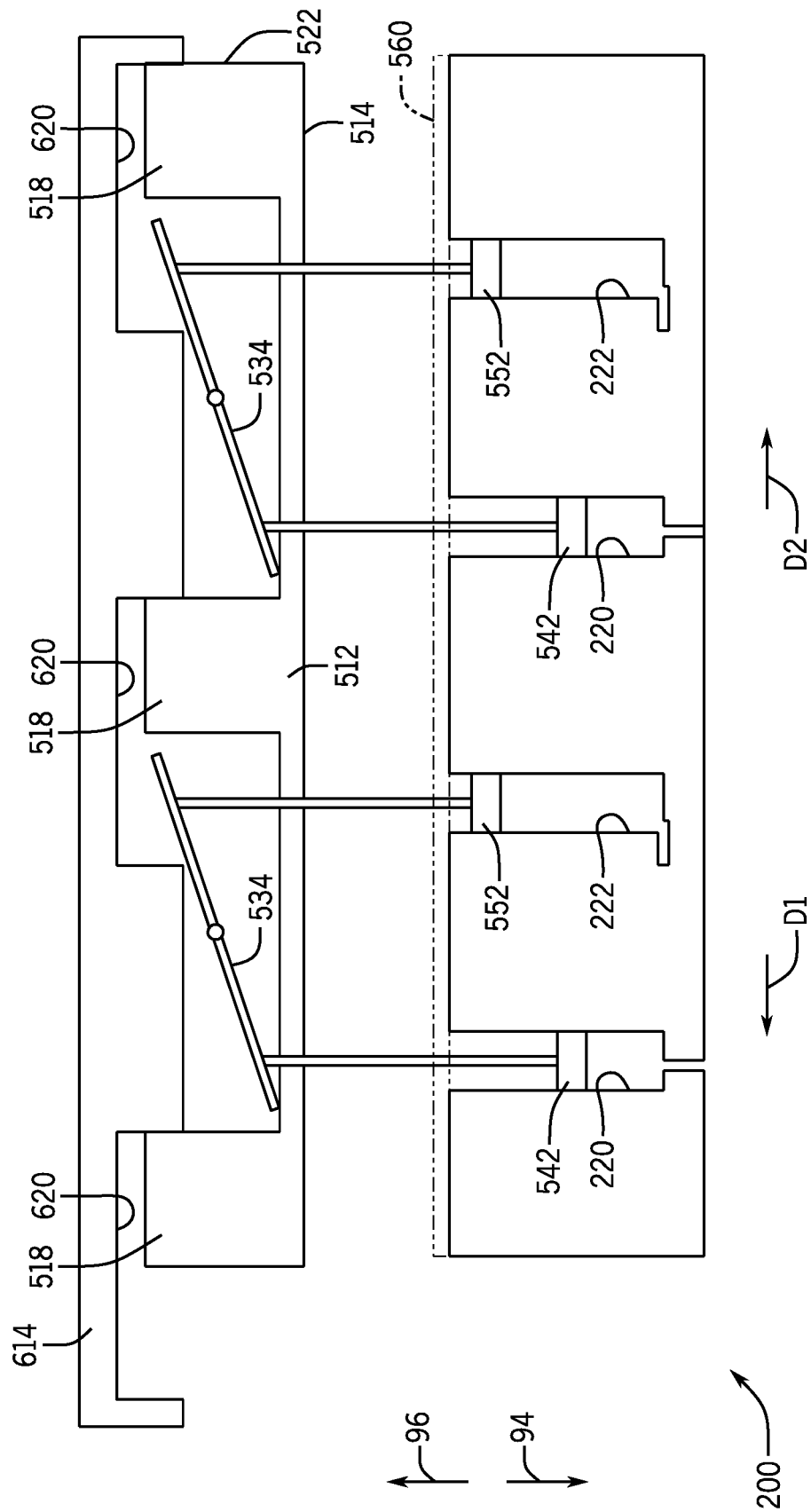

FIGS. 17A-E diagram an example sequence of the high clutch arrangement 510 to engage and disengage the gear set 600 with the high clutch arrangement 510 rotating in the first clock direction D1, and FIGS. 17F-H diagram an example sequence to disengage the high clutch arrangement 510 from the gear set 600 with the high clutch arrangement 510 rotating in the second clock direction D2. In FIG. 17A, the high clutch arrangement 510 is in the disengaged position relative to the planet carrier 614 of the gear set 600 such that the high clutch engagement elements 518 are disengaged from the high carrier engagement elements 620. The high guide 534 is in the retracted position. In one example, the high guide engagement surface 540 is substantially parallel or coplanar with the second ring face 516 of the high clutch ring 512 in the retracted position. Further, the first and second high pins 542, 552 are retracted in corresponding first and second high recesses 220, 222.

In FIG. 17B, the high chamber 210 (see FIG. 7, for example) is pressurized by the high clutch actuation assembly 320 to move the high clutch arrangement 510 in the second axial direction 96 to the engaged position relative to the planet carrier 614. Accordingly, the high clutch ring 512 is moved in the second axial direction 96 to bring the high clutch engagement elements 518 into engagement with the high carrier engagement elements 620. The high guide assembly 532 is moved in the second axial direction 96 with the high clutch ring 512. Thus, the first and second high pins 542, 552 are moved in the second axial direction 96 within corresponding first and second high recesses 220, 222.

In FIG. 17C, the high clutch arrangement 510 rotates in the first clock direction D1 with the inner hub 200. In this manner, the first rotational engagement faces 520 of respective high clutch engagement elements 518 are rotated into engagement with corresponding faces of the high carrier engagement elements 620. Accordingly, the high clutch ring 512, rotating together with the drive shaft 90 and the inner hub 200 in the first clock direction D1, drives the planet carrier 614 in the first clock direction D1. That is, the high clutch ring 512 engages the planet carrier 614 to rotationally fix the planet carrier 614 to the drive shaft 90, via the inner hub 200.

As shown in FIG. 17D, the high guide assembly 532 is operated to effect disengagement of the high clutch arrangement 510 from the gear set 600 in the "kickout" operation. In this example, the first high recesses 220 are pressurized by the first high guide actuation assembly 324 to move the first high pins 542 in the second axial direction 96. The first high pins 542 interact with the high guide 534 to pivot the high guide 534 in the first pivot direction P1. In this manner, the first guide end 538 is displaced in the second axial direction 96 and the high guide assembly 532 is moved to the first extended position.

In FIG. 17E, the planet carrier 614 rotates relative to the high clutch ring 512 in the first clock direction D1. The planet carrier 614 interacts with the ramped surface of the high guide engagement surface 540 to form a cam arrangement whereby relative rotation between the planet carrier 614 and high clutch ring 512 effects movement of high clutch ring 512 in the first axial direction 94. In this manner, the high clutch engagement elements 518 are disengaged from the corresponding high carrier engagement elements 620. Although not shown in FIGS. 17A-17E, it will be appreciated that movement of the high clutch arrangement 510 to the disengaged position may be completed, for example, under the biasing force of the high return spring.

In FIG. 17F, the high clutch arrangement 510 is in the engaged position such that the high clutch engagement elements 518 of the high clutch ring 512 are engaged in corresponding high carrier engagement elements 620. In addition, the high clutch arrangement 510 is rotated in the second clock direction D2 with the inner hub 200. In this manner, the second rotational engagement faces 522 of respective high clutch engagement elements 518 are rotated into engagement with corresponding faces of the high carrier engagement elements 620. Accordingly, the high clutch ring 512, rotating together with the drive shaft 90 and the inner hub 200 in the second clock direction D2, drive the planet carrier 614 in the second clock direction D2. That is, the high clutch ring 512 engages the planet carrier 614 to rotationally fix the planet carrier 614 to the drive shaft 90, via the inner hub 200.

In FIG. 17G, the high guide assembly 532 is operated to effect disengagement of the high clutch arrangement 510 from the gear set 600 in the "kickout" operation. In this example, the second high recesses 222 are pressurized by the second high guide actuation assembly 326 to move the second high pins 552 in the second axial direction 96. The second high pins 552 interact with the high guide 534 to pivot the high guide 534 in the second pivot direction P2. In this manner, the second guide end 550 is displaced in the second axial direction 96 and the high guide assembly 532 is moved to the second extended position.

In FIG. 17H, the planet carrier 614 rotates relative to the high clutch ring 512 in the second clock direction D2. The planet carrier 614 interacts with the ramped surface of high guide engagement surface 540 to form a cam arrangement whereby relative rotation between the planet carrier 614 and the high clutch ring 512 effects movement of the high clutch ring 512 in the first axial direction 94. In this manner, the high clutch engagement elements 518 are disengaged from the corresponding high carrier engagement elements 620. Although not shown in FIGS. 17F-H, it will be appreciated that movement of the high clutch arrangement 510 to the disengaged position may be completed, for example, under the biasing force of the high return spring.

As indicated above, the diagrams in FIGS. 17A-H will be understood to represent interactions between low clutch arrangement 410 and the gear set 600 as well, with the exception of relative rotations between the low clutch arrangement 410 and the planet carrier 614. For example, the low clutch arrangement 410 is grounded such that it does not rotate in either clock direction D1, D2. The low clutch arrangement 410 is moved into engagement with the gear set 600 such that the low clutch engagement elements 418 of the low clutch ring 412 engage the corresponding low carrier engagement elements 618 of the planet carrier.

The planet carrier 614 may be rotated in the first clock direction D1 such that the second rotational engagement face 422 of respective low clutch engagement elements 418 are engaged by corresponding faces of the low carrier engagement elements 618. In this manner, the low clutch arrangement 410 holds the planet carrier 614 against further rotation in the first clock direction D1. The low guide assembly 432 may be operated to disengage the low clutch arrangement 410 from the gear set 600. For example, the second low recesses 136 may be pressurized by the second low guide actuation assembly 316 to move the second low pins 452 in the second axial direction 96. The second low pins 452 interact with corresponding low guides 434 to pivot the low guides 434 in the second pivot direction P2. Rotation of the planet carrier 614 in the second clock direction D2 relative to the low clutch ring 412 effects interaction between the planet carrier 614 and the ramped surface of the low guide engagement surface 440 to form a cam arrangement. In this manner, rotation of the planet carrier 614 relative to the low clutch ring 412 effects movement of the low clutch ring 412 in the first axial direction 94 to effect the "kickout" operation. Movement of the low clutch arrangement 410 to the disengaged position may be completed, for example, under the biasing force of the low return spring.

Alternatively, the planet carrier 614 may be rotated in the second clock direction D2 such that the first rotational engagement face 420 of respective low clutch engagement elements 418 are engaged by corresponding faces of the low carrier engagement elements 618. In this manner, the low clutch arrangement 410 holds the planet carrier 614 against further rotation in the second clock direction D2. To disengage the low clutch arrangement 410 from the gear set 600, the first low recesses 134 may be pressurized by the first low guide actuation assembly 314 to move the first low pins 442 in the second axial direction 96. The first low pins 442 interact with corresponding low guides 343 to pivot the low guides 434 in the first pivot direction P1. Rotation of the planet carrier 614 in the first clock direction D1 relative to the low clutch ring 412 effects interaction between the planet carrier 614 and the ramped surface of the low guide engagement surface 440 to form a cam arrangement. In this manner, rotation of the planet carrier 614 relative to the low clutch ring 412 effects movement of the low clutch ring 412 in the first axial direction 94 to effect the "kickout" operation. Movement of the low clutch arrangement to the disengaged position may be completed, for example, under the biasing force of the low return spring.

In some examples, the low guide assembly 432 of the low clutch arrangement 410 includes first and second low pins 442, 452 as described above, operable to pivot the low guide 434 in the first and second pivot directions P1, P2. In other examples, the low guide assembly 432 may include only one of the first low pin 442 and the second low pin 452 operable to pivot each of the corresponding low guides 434 in only one of the first and second pivot directions P1, P2, respectively.

Figure 18:
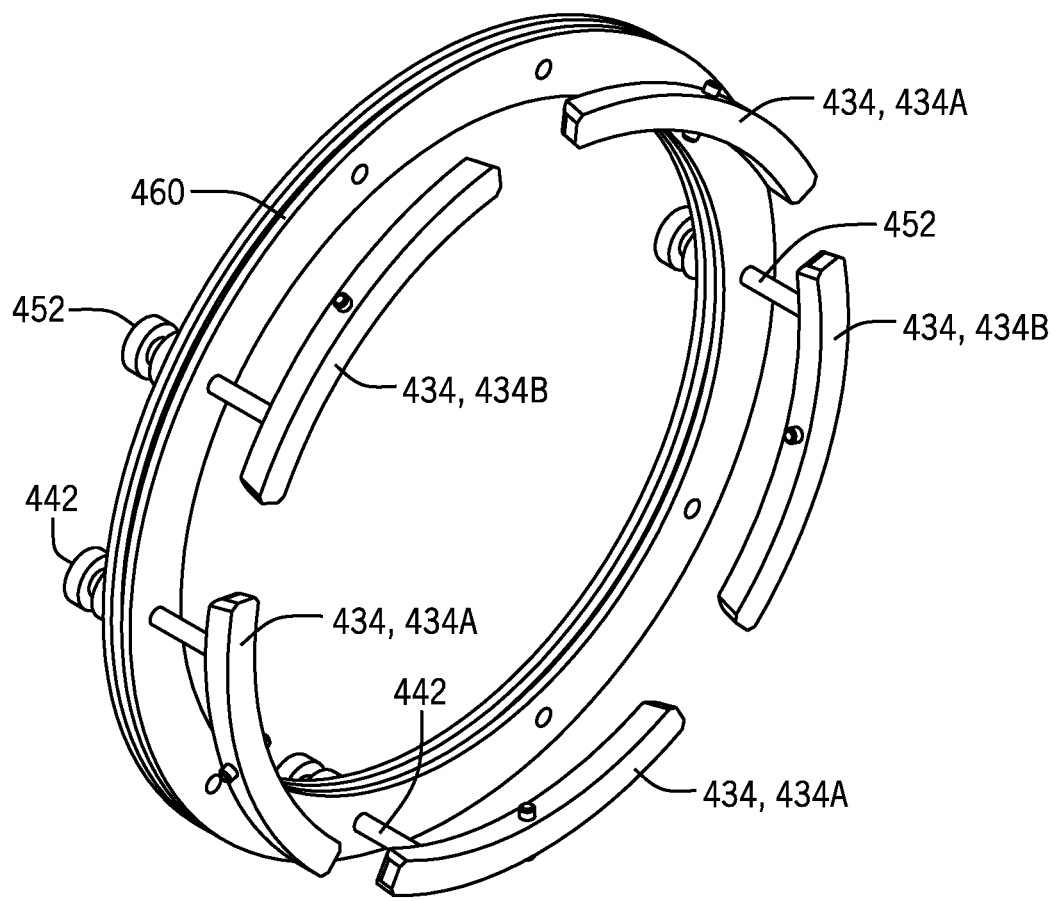
FIG. 18 is an isometric view showing another example of a low clutch arrangement of the drive assembly of FIGS. 3 and 4.

In further examples, as shown in FIG. 18, the low guide assembly 432 may include one of either the first low pin or the second low pin 442, 452 operable to pivot each low guide 434 in the first pivot direction P1 or the second pivot direction P2. That is, only one low pin may be provided to pivot a corresponding low guide 434, such that one or more low guides are pivotable in the first pivot direction P1 by a corresponding first low pin 442, and one or more low guides are pivotable in the second pivot direction P2 by a corresponding second low pin 452. Thus, the low guide assembly 432 may include a plurality of low guides 434, and the plurality of low guides 434 may include one or more first low guides 434A pivotable in the first pivot direction P1 by a first low pin 442 only, and one or more second low guides 434B pivotable in the second pivot direction P2 by a second low pin 452 only.

In some examples, the high guide assembly 532 of the high clutch arrangement 510 includes first and second high pins 542, 552 as described above operable to pivot the high guide 534 in the first and second pivot directions P1, P2. In other examples, the high guide assembly 532 may include only one of the first high pin 542 and the second high pin 552 operable to pivot each of the corresponding high guides 534 in only one of the first and second pivot directions P1, P2, respectively.

Figure 19:
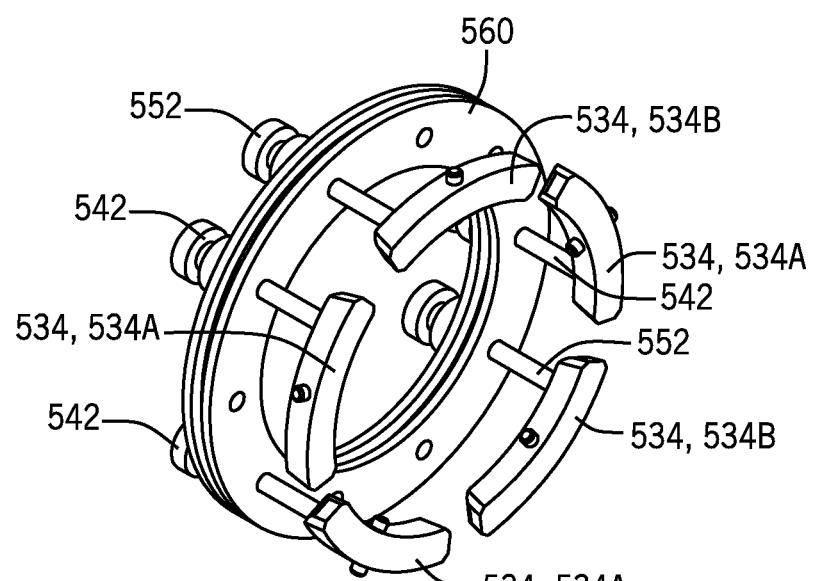
FIG. 19 is an isometric view showing another example of a high clutch arrangement of the drive assembly of FIGS. 3 and 4.

In further examples, as shown in FIG. 19, the high guide assembly 532 may include one of either the first high pin or the second high pin 552 operable to pivot each high guide 534 in the first pivot direction P1 or the second pivot direction P2. That is, only one high pin may be provided to pivot a corresponding high guide 534, such that one or more high guides are pivotable in the first pivot direction P1 by a corresponding first high pin 542, and one or more high guides are pivotable in the second pivot direction P2 by a corresponding second high pin 552. Thus, the high guide assembly 532 may include a plurality of high guides 534, and the plurality of high guides 534 may include one or more first high guides 534A pivotable in the first pivot direction P1 by a first high pin 542 only, and one or more second high guides 534B pivotable in the second pivot direction P2 by a second high pin 552 only.

The drive assembly 56 is operable in one or more modes representing different speeds (or "gears") and different output directions (e.g., "forward" as first clock direction D1 and "reverse" as second clock direction D2). The operational modes may include a forward low mode, a reverse low mode, a forward high mode and a reverse high mode. The operating modes are based the position of the clutch arrangements 410, 510 and the rotational direction of the drive shaft 90.

Figure 20:
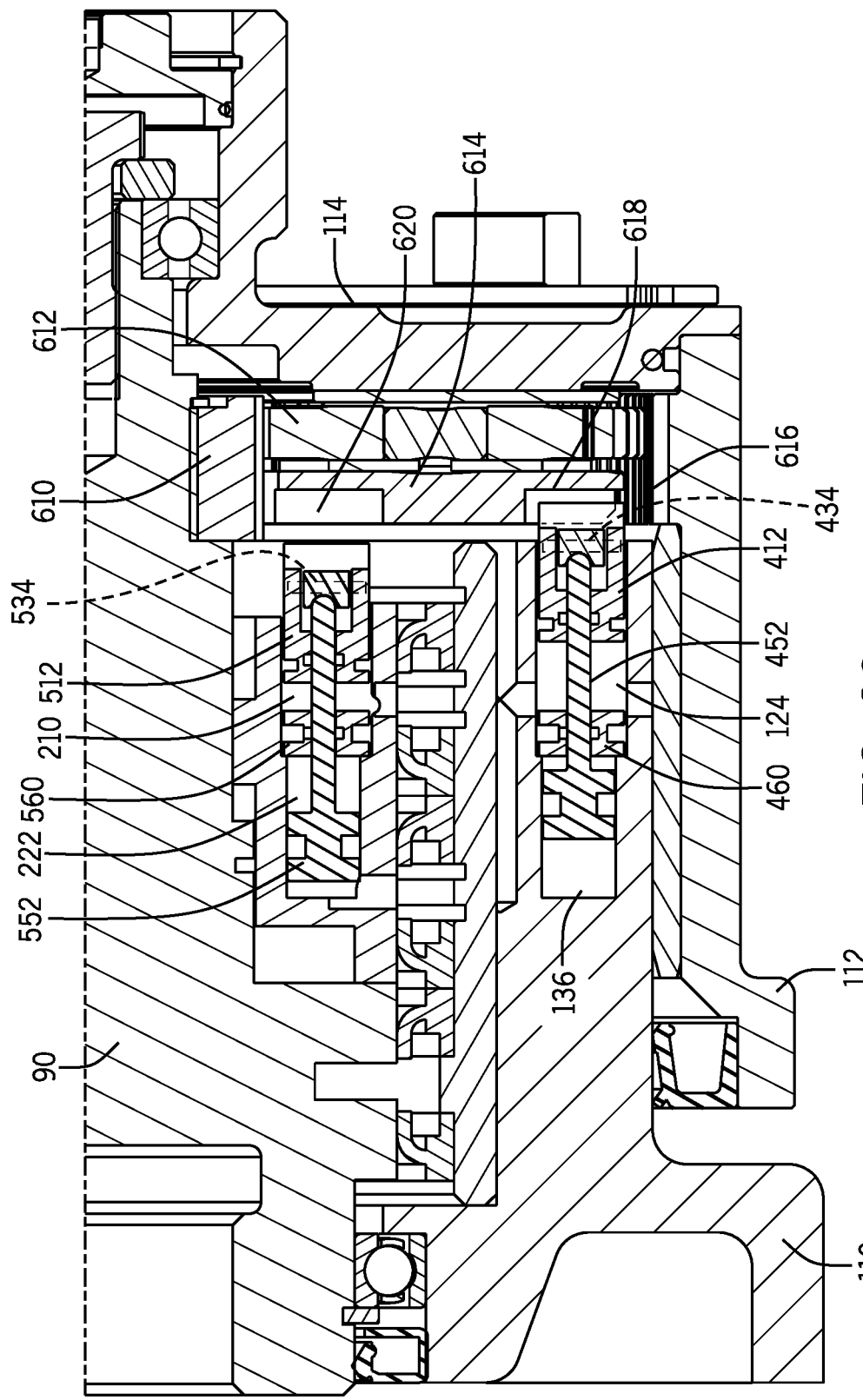
FIG. 20 is a partial cross-sectional view showing the low clutch arrangement engaged with the gear set of the drive assembly of FIGS. 3 and 4.

Referring to the partial cross-sectional view of the drive assembly 56 shown in FIG. 20, in the forward low mode, the drive shaft 90 is driven in the second clock direction D2 and the low clutch actuation assembly 310 is operated to pressurize the low chamber 124 such that the low clutch ring 412 of the low clutch arrangement 410 engages the planet carrier 614 of the gear set 600 to ground the planet carrier 614 (i.e., to hold the planet carrier 614 against rotation). The high clutch ring 512 of the high clutch arrangement 510 is maintained in the disengaged position.

As a result, in the forward low mode, the drive shaft 90 drives rotation of the sun gear 610, and in turn, rotation of the sun gear 610 drives rotation of the planet gears 612. With the planet carrier 614 held against rotation by the low clutch arrangement 410, rotation of the planet gears 612 drives the ring gear 616 to rotate in the first clock direction D1. The ring gear 616 rotates the second housing element 112 and the third housing element 114 rotates with the second housing element 112. The output element 88, formed as one piece with the third housing element 114 in this example, rotates with the third housing element 114 to output rotational speed and torque in the first clock direction D1.

In the reverse low mode, the drive shaft 90 is driven in the first clock direction D1 with the low clutch ring 412 of the low clutch arrangement engaged with the planet carrier 614. The high clutch ring 512 of the high clutch arrangement 510 is maintained in the disengaged position. As a result, in the reverse low mode, the drive shaft 90 drives rotation of the sun gear 610, and in turn, rotation of the sun gear 610 drives rotation of the planet gears 612. With the planet carrier 614 held against rotation by the low clutch arrangement 410, rotation of the planet gears 612 drives the ring gear 616 to rotate in the second clock direction D2. The ring gear 616 rotates the second housing element 112 and the third housing element 114 rotates with the second housing element 112. The output element 88, formed as one piece with the third housing element 114 in this example, rotates with the third housing element 114 to output rotational speed and torque in the first clock direction D2.

In this manner, engagement of the low clutch arrangement 410 enables bi-directional operation in low modes. For example, when operating in the forward low mode in which the input direction of the second clock direction D2 drives in the output direction of the first clock direction D1, the drive assembly 56 may transition into the reverse low mode by reversing the input direction into the first clock direction D1 to drive in the output direction of the second clock direction D2. A similar transition may occur from a reverse low mode to a forward low mode.

In one example, the drive assembly 56 may provide a 15:1 gear ratio in the power flow direction of the forward and reverse low modes. In other embodiments, other gear ratios (e.g., 10:1-30:1) may be provided. Accordingly, the drive assembly 56 may deliver torque at relatively lower speeds and higher torque output.

Figure 21:
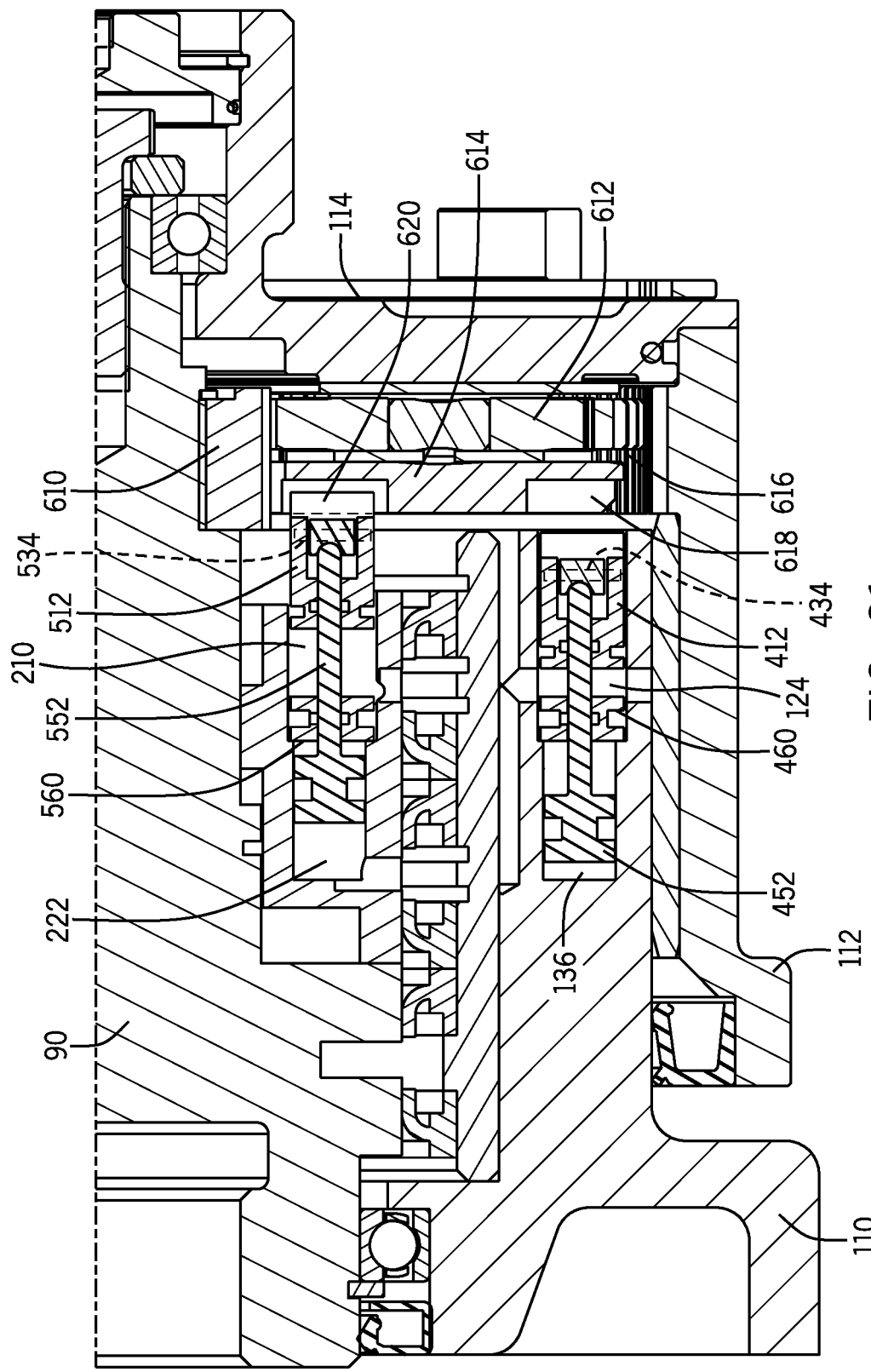
FIG. 21 is a partial cross-sectional view showing the high clutch arrangement engaged with the gear set of the drive assembly of FIGS. 3 and 4.

Referring now to FIG. 21, in the forward high mode, the drive shaft 90 is driven in the first clock direction D1. Moreover, in the forward high mode, the high clutch actuation assembly 320 pressurizes the high chamber 210 such that the high clutch ring 512 of the high clutch arrangement 510 is engaged with the planet carrier 614 of the gear set 600 to rotationally fix the planet carrier 614 to the drive shaft 90. With the planet carrier 614 locked to the drive shaft 90 (via the high clutch arrangement 510 and the inner hub 200), the sun gear 610, the planet gears 612 and the ring gear 616 are also rotationally fixed to the drive shaft 90. The low clutch arrangement 410 is maintained in the disengaged position.

As a result, in the forward high mode, the drive shaft 90 drives rotation of the sun gear 610, the planet carrier 614, the planet gears 612 and the ring gear 616. As such, the drive shaft 90, sun gear 610, planet carrier 614, planet gears 612 and ring gear 616 rotate as a unit on the drive axis and the ring gear 616 rotates in the same direction, i.e., the first clock direction D1, as the drive shaft 90. The ring gear 616 rotates the second housing element 112 and the third housing element 114 rotates with the second housing element 112. The output element 88, formed as one piece with the third housing element in this example, rotates with the third housing element 114 to output rotational speed and torque in the first clock direction D1.

In reverse high mode, operation of the high clutch arrangement 510 is the same as in the forward high mode, except that the drive shaft 90 is driven in the second clock direction D2 such that the ring gear 616 is also driven in the second clock direction D2. The ring gear 616 rotates the second housing element 112 and the third housing element 114 rotates with the second housing element 112. The output element 88, formed as one piece with the third housing element in this example, rotates with the third housing element 114 to output rotational speed and torque in the first clock direction D2. In this manner, the high clutch arrangement 510 may selectively operate in the forward high mode and the reverse high mode with bi-directionality based on the rotational direction of the drive shaft 90.

In this example, the drive assembly 56 provides a 1:1 gear ratio or direct gear ratio in the power flow direction of the forward and reverse high modes. In other examples, other gear ratios may be provided.

CONCLUSION

In examples herein, one or more clutch arrangements are provided with a corresponding guide assembly. The guide assembly is operable to effect disengagement of the clutch arrangement from a gear set. The guide assembly includes a guide mounted on the a clutch ring of the clutch arrangement. The guide is movable from a retracted position to an extended position to interact with the gear set. In some examples, the guide is pivotable in one pivot direction to move from the retracted position to the extended position. In this manner, the guide interacts with the gear set to form a cam arrangement, whereby rotation of the gear set in one direction relative to the clutch ring causes axial movement of the clutch ring away from the gear set.

In other examples, the guide is alternatively pivotable in a first pivot direction to move from the retracted position to a first extended position and in a second pivot direction to move the retracted position to a second extended position. In the first extended position, the guide interacts with the gear set to form a cam arrangement whereby rotation of the gear set in one direction relative to the clutch ring effects axial movement of the clutch ring away from the gear set. In the second extended position, the guide interacts with the gear set to form a cam arrangement whereby rotation of the gear set in another direction relative to the clutch ring effects axial movement clutch ring away from the gear set. Thus, the guide assembly is operable to perform a kickout operation of the clutch arrangement from the gear set. The kickout operation may effect disengagement of the clutch arrangement from the gear more quickly than under a biasing force of a return spring alone.

Enumerated Examples of Multi-Speed Drive Assembly with Guided Dog Clutch

The following examples of multi-speed drive assemblies with a guided dog clutch are further provided and numbered for ease of reference.

1. A drive assembly for a work vehicle includes a drive housing including a first housing element forming a reaction member, a drive shaft rotatable about a drive axis relative to the reaction member in a first rotation direction and alternatively a second rotation direction, an inner hub rotationally fixed to the drive shaft and a planetary gear set coupled to the drive shaft and configured to selectively rotate an output element in the first rotation direction and in the second rotation direction. The drive assembly further includes one or more clutch arrangements having a clutch ring configured to selectively engage the planetary gear set to effect a rotation speed of the output element, the one or more clutch arrangement further comprising a guide assembly mounted on the clutch ring. The guide assembly configured to selectively interact with the planetary gear set to effect disengagement of the clutch ring from the planetary gear set. One or more clutch actuation assemblies are configured to effect movement of the one or more clutch arrangements along the drive axis to selectively engage the planetary gear set. One or more guide actuation assemblies are configured to operate the guide assembly to interact with the planetary gear set to effect disengagement of the one or more clutch arrangements.

2. The drive assembly of example 1, wherein the guide assembly includes a guide movable from a retracted position to an extended position by the one or more guide actuation assemblies. The guide is configured to interact with the planetary gear set in the extended position.

3. The drive assembly of example 2, wherein the guide is pivoted from the retracted position to the extended position.

4. The drive assembly of example 3, wherein the guide assembly further comprises a first pin interfaced with the guide, and the guide actuation assembly effects movement of the first pin to pivot the guide to the extended position.

5. The drive assembly of example 3, wherein the guide is pivotable in a first pivot direction to a first extended position and in a second pivot direction to a second extended position.

6. The drive assembly of example 5, wherein the guide assembly further includes a first pin interfaced with the guide and a second pin interfaced with the guide, and the guide actuation assembly includes a first guide actuation assembly configured to effect movement of the first pin to pivot the guide in the first pivot direction to the first extended position and a second guide actuation assembly configured to effect movement of the second pin to pivot the guide in the second pivot direction to the second extended position.

7. The drive assembly of example 1, wherein the one or more clutch arrangements include a first clutch arrangement having a first clutch ring configured to selectively engage the planetary gear set to effect a first rotation speed of the output element. The first clutch arrangement further includes a first guide assembly mounted on the first clutch ring. The first guide assembly is configured to selectively interact with the planetary gear set to effect disengagement of the first clutch ring from the planetary gear set. The one or more clutch arrangements also include a second clutch arrangement having a second clutch ring configured to selectively engage the planetary gear set to effect a second rotation speed of the output element. The second clutch arrangement further includes a second guide assembly mounted on the second clutch ring. The second guide assembly is configured to selectively interact with the planetary gear set to effect disengagement of the second clutch ring from the planetary gear set.

8. The drive assembly of example 7, wherein the first clutch arrangement is coupled to the first housing element.

9. The drive assembly of example 8, wherein the first housing element includes a mounting portion and a wall portion having a first chamber arranged between a first inner wall and a first outer wall. The first clutch arrangement is at least partially arranged in the first chamber.

10. The drive assembly of example 9, wherein the one or more clutch actuation assemblies includes a first clutch actuation assembly, and the first clutch ring is repositionable from a disengaged position to an engaged position relative to the gear set by operation of the first clutch actuation assembly.

11. The drive assembly of example 7, wherein the second clutch arrangement is coupled to the inner hub.

12. The drive assembly of example 11, wherein the inner hub includes a second chamber arranged between a second inner wall and a second outer wall. The second clutch arrangement is at least partially arranged in the second chamber.

13. The drive assembly of example 12, wherein the one or more clutch actuation assemblies includes a second clutch actuation assembly, and the second clutch ring is repositionable from a disengaged position to an engaged position relative to the gear set by operation of the second clutch actuation assembly.

14. A drive assembly for a work vehicle includes a housing arrangement having a first housing element forming a reaction member and having a mounting portion, a wall portion and a low chamber arranged between a first inner wall and a first outer wall of the wall portion, a drive shaft rotatable on a drive axis extending through the housing arrangement, and an inner hub rotatably fixed to the drive shaft, the inner hub having a high chamber arranged between a second inner wall and second outer wall. The drive assembly also includes a planetary gear set coupled to the drive shaft and configured to selectively rotate an output element. The planetary gear set includes a sun gear coupled to drive shaft, a set of planet gears engaged with the sun gear, a planet carrier to which the planet gears are mounted and a ring circumscribing and engaged with the planet gears. The drive assembly further includes a low clutch arrangement and a high clutch arrangement. The low clutch arrangement is coupled to the first housing element and is at least partially arranged in the low chamber. The low clutch arrangement includes a low clutch ring repositionable in the low chamber between a disengaged position and an engaged position relative to the planet carrier, and a low guide assembly mounted in the low clutch ring. The low guide assembly includes a plurality of low guides configured to selectively interact with the planet carrier to effect disengagement of the low clutch ring from the planet carrier. The high clutch arrangement is coupled to the inner hub and at least partially arranged in the high chamber. The high clutch arrangement includes a high clutch ring repositionable in the high chamber between a disengaged position and an engaged position relative to the planet carrier, and a high guide assembly mounted to the high clutch ring. The high guide assembly includes a plurality of high guides configured to selectively interact with the planet carrier to effect disengagement of the high clutch ring from the planet carrier.

15. The drive assembly of example 14, wherein the low guides are pivotable to an extended position to interact with the planet carrier such that rotation of the planet carrier relative to the low clutch ring effects axial movement of the low clutch ring away from the planet carrier, and the high guides are pivotable to an extended position to interact with the planet carrier such that rotation of the planet carrier relative to the high clutch ring effects axial movement of the high clutch ring away from the planet carrier.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for a work vehicle comprising:
a drive housing including a first housing element forming a reaction member;
a drive shaft rotatable about a drive axis relative to the reaction member in a first rotation direction and alternatively a second rotation direction;
an inner hub rotationally fixed to the drive shaft;
a planetary gear set coupled to the drive shaft and configured to selectively rotate an output element in the first rotation direction and in the second rotation direction;
one or more clutch arrangements comprising a clutch ring configured to selectively engage the planetary gear set to effect a rotation speed of the output element, the one or more clutch arrangement further comprising a guide assembly mounted on the clutch ring, the guide assembly configured to selectively interact with the planetary gear set to effect disengagement of the clutch ring from the planetary gear set;
one or more clutch actuation assemblies configured to effect movement of the one or more clutch arrangements along the drive axis to selectively engage the planetary gear set; and
one or more guide actuation assemblies configured to operate the guide assembly to interact with the planetary gear set to effect disengagement of the one or more clutch arrangements;
wherein the guide assembly comprises a guide pivotable from a retracted position to an extended position by the one or more guide actuation assemblies, wherein the guide is configured to interact with the planetary gear set in the extended position.

2. The drive assembly of claim 1, wherein the guide assembly further comprises a first pin interfaced with the guide, and the guide actuation assembly effects movement of the first pin to pivot the guide to the extended position.

3. The drive assembly of claim 2, wherein the guide assembly comprises a plurality of the guides.

4. The drive assembly of claim 1, wherein the guide is pivotable in a first pivot direction to a first extended position and in a second pivot direction to a second extended position.

5. The drive assembly of claim 4, wherein the guide assembly further comprises a first pin interfaced with the guide and a second pin interfaced with the guide, and the guide actuation assembly comprises a first guide actuation assembly configured to effect movement of the first pin to pivot the guide in the first pivot direction to the first extended position and a second guide actuation assembly configured to effect movement of the second pin to pivot the guide in the second pivot direction to the second extended position.

6. The drive assembly of claim 5, wherein the guide assembly comprises a plurality of the guides.

7. The drive assembly of claim 1, wherein the one or more clutch arrangements include:
- a first clutch arrangement having a first clutch ring configured to selectively engage the planetary gear set to effect a first rotation speed of the output element, the first clutch arrangement further comprising a first guide assembly mounted on the first clutch ring, the first guide assembly configured to selectively interact with the planetary gear set to effect disengagement of the first clutch ring from the planetary gear set; and
- a second clutch arrangement having a second clutch ring configured to selectively engage the planetary gear set to effect a second rotation speed of the output element, the second clutch arrangement further comprising a second guide assembly mounted on the second clutch ring, the second guide assembly configured to selectively interact with the planetary gear set to effect disengagement of the second clutch ring from the planetary gear set.

8. The drive assembly of claim 7, wherein the first clutch arrangement is coupled to the first housing element.

9. The drive assembly of claim 8, wherein the first housing element includes a mounting portion and a wall portion, the wall portion having a first chamber arranged between a first inner wall and a first outer wall, wherein the first clutch arrangement is at least partially arranged in the first chamber.

10. The drive assembly of claim 9, wherein the one or more clutch actuation assemblies includes a first clutch actuation assembly, and the first clutch ring is repositionable from a disengaged position to an engaged position relative to the planetary gear set by operation of the first clutch actuation assembly.

11. The drive assembly of claim 10, wherein the first clutch actuation assembly is a hydraulic actuation assembly and is configured to pressurize the first chamber to reposition the first clutch ring from the disengaged position to the engaged position.

12. The drive assembly of claim 7, wherein the second clutch arrangement is coupled to the inner hub.

13. The drive assembly of claim 12, wherein the inner hub includes a second chamber arranged between a second inner wall and a second outer wall, wherein the second clutch arrangement is at least partially arranged in the second chamber.

14. The drive assembly of claim 13, wherein the one or more clutch actuation assemblies includes a second clutch actuation assembly, and the second clutch ring is repositionable from a disengaged position to an engaged position relative to the planetary gear set by operation of the second clutch actuation assembly.

15. The drive assembly of claim 14, wherein the second clutch actuation assembly is a hydraulic actuation assembly and is configured to pressurize the second chamber to reposition the second clutch ring from the disengaged position to the engaged position.

16. A drive assembly for a work vehicle comprising:
- a housing arrangement having a first housing element forming a reaction member, the first housing element having a mounting portion, a wall portion and a low chamber arranged between a first inner wall and a first outer wall of the wall portion;
- a drive shaft rotatable on a drive axis extending through the housing arrangement;
- an inner hub rotatably fixed to the drive shaft, the inner hub having a high chamber arranged between a second inner wall and second outer wall;
- a planetary gear set coupled to the drive shaft and configured to selectively rotate an output element, the planetary gear set comprising a sun gear coupled to drive shaft, a set of planet gear engaged with the sun gear, a planet carrier to which the planet gears are mounted and a ring circumscribing and engaged with the planet gears;
- a low clutch arrangement coupled to the first housing element and at least partially arranged in the low chamber, the low clutch arrangement comprising a low clutch ring repositionable in the low chamber between a disengaged position and an engaged position relative to the planet carrier, and a low guide assembly mounted in the low clutch ring, the low guide assembly having a plurality of low guides configured to selectively interact with the planet carrier to effect disengagement of the low clutch ring from the planet carrier; and
- a high clutch arrangement coupled to the inner hub and at least partially arranged in the high chamber, the high clutch arrangement comprising a high clutch ring repositionable in the high chamber between a disengaged position and an engaged position relative to the planet carrier, and a high guide assembly mounted to the high clutch ring, the high guide assembly having a plurality of high guides configured to selectively interact with the planet carrier to effect disengagement of the high clutch ring from the planet carrier.

17. The drive assembly of claim 16, wherein the low guides are pivotable to an extended position to interact with the planet carrier such that rotation of the planet carrier relative to the low clutch ring effects axial movement of the low clutch ring away from the planet carrier.

18. The drive assembly of claim 17, wherein the high guides are pivotable to an extended position to interact with the planet carrier such that rotation of the planet carrier relative to the high clutch ring effects axial movement of the high clutch ring away from the planet carrier.

* * * * *